United States Patent
Li et al.

(10) Patent No.: US 11,595,206 B2
(45) Date of Patent: Feb. 28, 2023

(54) KEY UPDATE METHOD AND APPARATUS

(71) Applicant: HUAWEI TECHNOLOGIES CO., LTD., Guangdong (CN)

(72) Inventors: He Li, Shanghai (CN); Jing Chen, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 147 days.

(21) Appl. No.: 16/922,485

(22) Filed: Jul. 7, 2020

(65) Prior Publication Data
US 2020/0336305 A1 Oct. 22, 2020

Related U.S. Application Data

(63) Continuation of application No. PCT/CN2019/070709, filed on Jan. 7, 2019.

(30) Foreign Application Priority Data

Jan. 8, 2018 (CN) .......................... 201810016762.9

(51) Int. Cl.
  *H04L 9/08* (2006.01)
  *H04W 12/06* (2021.01)
  *H04W 12/0433* (2021.01)

(52) U.S. Cl.
  CPC ....... *H04L 9/0891* (2013.01); *H04W 12/0433* (2021.01); *H04W 12/06* (2013.01)

(58) Field of Classification Search
  CPC ............... H04L 9/0891; H04L 9/0844; H04W 12/0433; H04W 12/06; H04W 12/0431; H04W 76/15

(Continued)

(56) References Cited

U.S. PATENT DOCUMENTS

2009/0305671 A1* 12/2009 Luft ...................... H04W 8/183
                                                          455/411
2009/0316909 A1   12/2009 Futa et al.
                         (Continued)

FOREIGN PATENT DOCUMENTS

CN        101079705 A     11/2007
CN        101577912 A     11/2009
                         (Continued)

OTHER PUBLICATIONS

Office Action issued in Japanese Application No. 2020-537753 dated Sep. 21, 2021, 7 pages (with English translation).

(Continued)

*Primary Examiner* — Jacob Lipman
(74) *Attorney, Agent, or Firm* — Fish & Richardson P.C.

(57) ABSTRACT

Embodiments of this application provide key update methods and apparatuses in the field of communications technologies. A communications system includes a terminal and a core network device. The terminal can access the core network device using both a first access technology and a second access technology. The first connection and the second connection have a shared key. Key update for the first connection is performed in obtaining a first key identifier that identifies a first key obtained by performing the key update for the first connection. In response to determining that the second connection is in a connected state, the shared key for the second connection and a second key identifier that identifies the shared key are retained. The shared key is kept using for the second connection before performing key update for the second connection.

20 Claims, 15 Drawing Sheets

(58) Field of Classification Search
USPC .......................................................... 380/277
See application file for complete search history.

(56) References Cited

U.S. PATENT DOCUMENTS

| | | | |
|---|---|---|---|
| 2015/0236851 A1* | 8/2015 | Bi ........................ | H04L 9/3268 380/282 |
| 2016/0249210 A1 | 8/2016 | Chang et al. | |
| 2017/0331625 A1* | 11/2017 | Chen .................. | H04L 63/0428 |

FOREIGN PATENT DOCUMENTS

| | | |
|---|---|---|
| CN | 102158862 A | 8/2011 |
| JP | 2009017537 A | 1/2009 |
| JP | 2011087249 A | 4/2011 |
| RU | 2617836 C2 | 4/2017 |
| WO | 2011097890 A1 | 8/2011 |
| WO | 2017159970 A1 | 9/2017 |

OTHER PUBLICATIONS

3GPP TS 33.501 V0.6.0 (Dec. 2017), "3rd Generation Partnership Project; Technical Specification Group Services and System Aspects; Security Architecture and Procedures for 5G System (Release 15)," Dec. 2017, 79 pages.

3GPP TS 23.501 V15.0.0 (Dec. 2017), "3rd Generation Partnership Project; Technical Specification Group Services and System Aspects; System Architecture for the 5G System; Stage 2 (Release 15)," Dec. 2017, 181 pages.

Ericsson, "Multiple active NAS connections in the same PLMN's serving network," 3GPP TSG SA WG3 (Security) Meeting #89, S3-173371, Reno, Nov. 27-Dec. 1, 2017, 5 pages.

Ericsson, "Security for multiple NAS connections with single anchor key," 3GPP TSG SA WG3 (Security) Meeting #88Bis, S3-172554, Singapore, Oct. 9-13, 2017, 2 pages.

Huawei et al., "Add context for multiple registrations in the same PLMN," 3GPP TSG SA WG3 (Security) Meeting #90, S3-180202, Gothenburg, Sweden, Jan. 22 -26, 2018, 2 pages.

Huawei et al., "Add new requirements for multiple registrations in the same PLMN," 3GPP TSG SA WG3 (Security) Meeting #89, S3-173193, Reno, NV, US, Nov. 27-Dec. 1, 2017, 1 page.

Nokia, "Clause 6.6.2.2 Multiple active NAS connections in the same PLMN," 3GPP TSG SA WG3 (Security) Meeting #89, S3-173108, Nevada, USA, Nov. 27-Dec. 1, 2017, 2 pages.

Nokia, "Clause 6.3.4.2 Multiple registrations in the same PLMN," 3GPP TSG SA WG3 (Security) Meeting #89, 53-173109, Reno, US, Nov. 27-Dec. 1, 2017, 2 pages.

Office Action issued in Chinese Application No. 201810016762 9 dated Jan. 22, 2020, 9 pages (with English translation).

PCT International Search Report and Written Opinion issued in International Application No. PCT/CN2019/070709 dated Apr. 2, 2019, 15 pages (with English translation).

Extended European Search Report issued in European Application No. 19735959.9 dated Jan. 29, 2021, 12 pages.

Office Action issued in Russian Application No. 2020126333/07(046187) dated Apr. 28, 2022, 12 pages (with English translation).

Extended European Search Report in European Appln No. 22169110.8, dated Dec. 21, 2022, 9 pages.

* cited by examiner

KEY UPDATE METHOD AND APPARATUS

CROSS-REFERENCE TO RELATED APPLICATIONS

This application is a continuation of International Application No. PCT/CN2019/070709, filed on Jan. 7, 2019, which claims priority to Chinese Patent Application No. 201810016762.9, filed on Jan. 8, 2018. The disclosures of the aforementioned applications are hereby incorporated by reference in their entireties.

TECHNICAL FIELD

This application relates to the field of communications technologies, and in particular, to a key update method and apparatus.

BACKGROUND

In a 5th generation (5G) system, a terminal may access an access and mobility management function (AMF) node by using both a 3rd generation partnership project (3GPP) access technology and a non-3GPP (non-3GPP) access technology simultaneously. When the terminal accesses the AMF node by using both the 3GPP access technology and the non-3GPP access technology simultaneously, the AMF node maintains a registration management (RM) state machine and a connection management (CM) state machine for the 3GPP access technology and the non-3GPP access technology respectively.

The registration management state machine corresponds to an RM state, and the RM state includes an RM-registration state and an RM-deregistration state. The connection management state machine corresponds to a CM state, and the CM state includes a CM-connected state and a CM-idle state. After entering the connected state from the idle state, the terminal may initiate a registration procedure. After completing the registration procedure, the terminal may switch from the deregistration state to the registration state. In this case, the terminal has security context information such as a non-access stratum (NAS) key and a security algorithm. When the terminal returns to the idle state or the deregistration state, the terminal still has the NAS key and the security algorithm.

Although the AMF node may separately maintain the state machine for the 3GPP access technology and the state machine for the non-3GPP access technology, the terminal and the AMF node may share a set of NAS keys when communicating by using the two access technologies. When the AMF node needs to perform re-authentication on the terminal by using either of the access technologies, a re-authentication process involves an update of the NAS key. However, when the terminal and the AMF node communicate by using the other access technology, the terminal and the AMF still need to use the shared NAS key, or the terminal and the AMF node are communicating by using the shared NAS key. In this case, the update of the NAS key in the process in which the AMF node performs re-authentication on the terminal by using one access technology may affect normal communication that is performed between the terminal and the AMF node by using the other access technology.

SUMMARY

Embodiments of this application provide a key update method and apparatus, to resolve a problem that an update of a NAS key in a process in which an AMF node performs re-authentication on a terminal by using one access technology affects normal communication that is performed between the terminal and the AMF node by using another access technology.

According to a first aspect, an embodiment of this application provides a key update method, applied to a communications system. The communications system includes a terminal and a core network device. The terminal accesses the core network device by using both a first access technology and a second access technology simultaneously. The method includes: performing, by the core network device, re-authentication on the terminal through a first connection corresponding to the first access technology; and if a trigger condition is met, updating, by the core network device, a key for a second connection corresponding to the second access technology. According to the method, the core network device may perform re-authentication on the terminal through the first connection, and a key for the first connection may be updated in a re-authentication process. When a first trigger condition is met, the core network device may update the key for the second connection. When a second trigger condition is met, the terminal may update the key for the second connection. In this way, when the terminal accesses an AMF node by using a plurality of access technologies, re-authentication may be performed on the terminal through the first connection on a premise that normal communication that is performed between the terminal and the AMF node through the second connection is not affected, and the keys of the two connections are updated.

In a possible design, the trigger condition is a state of the second connection, and the state of the second connection is a connected state or an idle state.

According to the method, if determining that re-authentication needs to be performed on the terminal through the first connection, the core network device further needs to determine the state of the second connection, performs re-authentication on the terminal through the first connection only when the second connection is in the idle state, and updates the keys for the first connection and the second connection. Because the second connection is in the idle state, the key update process does not affect normal use of the second connection by the terminal and the core network device.

In a possible design, the trigger condition is that the second connection is in the idle state; and if the core network device determines to perform re-authentication on the terminal through the first connection, and the second connection is in the connected state, the core network device sends a first message to the terminal through the first connection, where the first message is used to instruct the terminal to suspend using the first connection. According to the method, if the terminal continues to send a NAS message to the core network device through the first connection, a NAS count may wrap around. In this case, the terminal is notified in time to suspend using the first connection.

In a possible design, the trigger condition is that the second connection is in the idle state; and the core network device obtains a first key identifier in a process of performing re-authentication on the terminal through the first connection, where the first key identifier is used to identify an updated key for the first connection.

In a possible design, after performing re-authentication on the terminal through the first connection corresponding to the first access technology, the core network device may send instruction information to the terminal through the first connection, where the instruction information is used to instruct the terminal to update the key corresponding to the second connection. According to the method, after updating the key corresponding to the second connection, the core network device instructs the terminal in time to update the key for the second connection. Therefore, it can be ensured that the core network device and the terminal perform security protection on the message by using the same key when transmitting a message subsequently through the second connection.

Optionally, the instruction information may be the first key identifier. After receiving the first key identifier, the terminal may update the key for the second connection to a key identified by the first key identifier.

In a possible design, the trigger condition is that the second connection is in the connected state; and a method for updating, by the core network device, the key for the second connection corresponding to the second access technology is: suspending, by the core network device, using the second connection; and then updating, by the core network device, the key for the second connection. According to the method, the core network device suspends using the second connection, and then updates the key for the second connection. This can avoid that a key update procedure affects normal communication that is performed by the core network device through the second connection.

In a possible design, in a process in which the core network device performs re-authentication on the terminal through the first connection, the core network device may obtain a first key identifier, and retain a second key identifier and the key for the second connection that is used before update, where the first key identifier is used to identify an updated key for the first connection, and the second key identifier is used to identify the key for the second connection that is used before update.

In a possible design, after performing re-authentication on the terminal through the first connection corresponding to the first access technology, the core network device may start a timer.

In a possible design, the trigger condition is:

the core network device receives, before the timer expires, a second message that is sent by the terminal through the second connection, and security verification that is performed by the core network device on the second message by using the key for the second connection that is used before update succeeds;

the timer expires, and the core network device does not receive, before the timer expires, a second message that is sent by the terminal through the second connection;

after the timer expires, the core network device receives a second message that is sent by the terminal through the second connection and on which security protection is not performed; or after the timer expires, the core network device receives a second message that is sent by the terminal through the second connection, and security verification that is performed by the core network device on the second message by using an updated key for the second connection succeeds.

In a possible design, the core network device may send a third message to the terminal through the first connection, where the third message includes the first key identifier, the second key identifier, or instruction information, and the instruction information is used to instruct the terminal to start the timer. According to the method, when the core network device determines that re-authentication needs to be performed through the first connection, if the second connection is in the connected state, the core network device may directly perform re-authentication on the terminal through the first connection; in a re-authentication process, the key for the second connection that is used before update may be retained. In this way, even if the core network device updates the key for the first connection by performing re-authentication on the terminal through the first connection, when the core network device and the terminal communicate with each other through the second connection, the key for the second connection that is used before update may still be used, and normal communication through the second connection is not affected. In addition, in the method, the first connection and the second connection are decoupled. When performing authentication on the terminal through the first connection, the core network device does not need to detect the state of the second connection. After the timer expires, both the core network device and the terminal can actively update the key for the second connection, thereby reducing overheads of signaling interaction between the core network device and the terminal, and simplifying implementation.

In a possible design, after the core network device updates the key for the second connection corresponding to the second access technology, the core network device may delete the key for the second connection that is used before update and the second key identifier.

In a possible design, if the second connection is in the connected state, after the core network device performs re-authentication on the terminal through the first connection corresponding to the first access technology, the core network device may set a first mark, where the first mark is used to mark that the core network device has re-authenticated the terminal through the first connection, or is used to instruct to update the key for the second connection.

In a possible design, the trigger condition is that the second connection is switched to the idle state, and the core network device determines that the first mark exists.

In a possible design, the trigger condition is that the core network device determines that the first mark exists; and a method for updating, by the core network device, the key for the second connection corresponding to the second access technology includes: if the second connection is in the connected state, suspending, by the core network device, using the second connection; and then updating, by the core network device, the key for the second connection.

In a possible design, after the core network device updates the key for the second connection corresponding to the second access technology, the core network device may obtain a third key identifier, where the third key identifier is used to identify the updated key for the first connection and the updated key for the second connection; and then the core network device sends the third key identifier to the terminal.

In a possible design, after performing re-authentication on the terminal through the first connection corresponding to the first access technology, the core network device sends instruction information to the terminal, where the instruction information is used to instruct the terminal to update the key for the second connection.

In a possible design, the trigger condition is that the core network device determines that a second mark exists, and the second connection is in the idle state; and after the core network device performs re-authentication on the terminal through the first connection, the core network device may set the second mark, where the second mark is used to instruct to update the key for the second connection.

According to a second aspect, an embodiment of this application provides a key update method, applied to a communications system. The communications system includes a terminal and a core network device. The terminal accesses the core network device by using both a first access technology and a second access technology simultaneously. The method includes: performing, by the terminal, re-authentication through a first connection corresponding to the first access technology; and if a trigger condition is met, updating, by the terminal, a key for a second connection corresponding to the second access technology. According to the method, the terminal updates the key for the second connection corresponding to the second access technology only when the trigger condition is met, so that re-authentication may be performed on the terminal through the first connection on a premise that normal communication that is performed between the terminal and an AMF node through the second connection is not affected.

In a possible design, the trigger condition is that a state of the second connection is an idle state.

In a possible design, the performing, by the terminal, re-authentication through a first connection corresponding to the first access technology includes: in a process of performing re-authentication through the first connection, retaining, by the terminal, a key identifier and the key for the second connection that is used before update, where the key identifier is used to identify the key for the second connection that is used before update.

In a possible design, the trigger condition is that a timer expires; and after performing re-authentication through the first connection corresponding to the first access technology, the terminal may start the timer.

In a possible design, after the starting, by the terminal, the timer, the method further includes: before the timer expires, sending, by the terminal, a message to the core network device through the second connection, where security protection is performed on the message by using the key for the second connection that is used before update; after the timer expires, sending, by the terminal, a message to the core network device through the second connection, where security protection is not performed on the message; or after the timer expires, sending, by the terminal, a message to the core network device through the second connection, where security protection is performed on the message by using an updated key for the second connection.

In a possible design, after the updating, by the terminal, a key for a second connection corresponding to the second access technology, the method further includes: deleting, by the terminal, the key for the second connection that is used before update and the key identifier.

According to a third aspect, an embodiment of this application provides an apparatus, and the apparatus has a function of implementing actions of the core network device in the foregoing method design. The function may be implemented by hardware, or may be implemented by hardware by executing corresponding software. The hardware or the software includes one or more modules corresponding to the foregoing function. For example, the apparatus may be a core network device, or may be a chip in a core network device.

In a possible design, the apparatus is a core network device, and the core network device includes a processor. The processor is configured to support the core network device in performing a corresponding function in the foregoing method. Further, the core network device may further include a transmitter and a receiver, where the transmitter and the receiver are configured to support communication between the core network device and a terminal. Further, the core network device may further include a memory, and the memory is configured to: be coupled to the processor, and store program instructions and data necessary for the terminal.

According to a fourth aspect, an embodiment of this application provides an apparatus, and the apparatus has a function of implementing actions of the terminal in the foregoing method design. The function may be implemented by hardware, or may be implemented by hardware by executing corresponding software. The hardware or the software includes one or more modules corresponding to the foregoing function. For example, the apparatus may be a terminal, or may be a chip in a terminal.

In a possible design, the apparatus is a terminal, and the terminal includes a processor. The processor is configured to support the terminal in performing the corresponding function in the foregoing method. Further, the terminal may further include a transmitter and a receiver, where the transmitter and the receiver are configured to support communication between the terminal and the core network device. Further, the terminal may further include a memory, and the memory is configured to be coupled to the processor and store program instructions and data necessary for the terminal.

According to a fifth aspect, an embodiment of this application provides a communications system, where the system includes the terminal and the core network device described in the foregoing aspects. Optionally, the system may further include a base station, an N3IWF node, and the terminal and the core network device described in the foregoing aspects.

According to a sixth aspect, an embodiment of this application provides a computer storage medium, configured to store computer software instructions used by the foregoing core network device. The computer storage medium contains a program designed for executing the first aspect.

According to a seventh aspect, an embodiment of this application provides a computer storage medium, configured to store a computer software instruction used by the foregoing terminal. The computer software instruction includes a program designed for executing the second aspect.

According to an eighth aspect, an embodiment of this application provides a computer program product including an instruction. When the computer program product is run on a computer, the computer is enabled to perform the method described in the first aspect.

According to a ninth aspect, an embodiment of this application provides a computer program product including an instruction. When the computer program product is run on a computer, the computer is enabled to perform the method described in the second aspect.

According to a tenth aspect, an embodiment of this application provides a chip system, applied to a core network device. The chip system includes at least one processor, a memory, and a transceiver circuit. The memory, the transceiver circuit, and the at least one processor are connected to each other through lines. The at least one memory stores an instruction. The instruction is executed by the processor to execute operations of the core network device in the method described in the first aspect.

According to an eleventh aspect, an embodiment of this application provides a chip system, applied to a terminal. The chip system includes at least one processor, a memory, and a transceiver circuit. The memory, the transceiver circuit, and the at least one processor are connected to each other through lines. The at least one memory stores an instruction. The instruction is executed by the processor to execute operations of the terminal in the method described in the second aspect.

According to the method provided in the embodiments of this application, the core network device may perform re-authentication on the terminal through the first connection, and the key for the first connection may be updated in a re-authentication process. When the first trigger condition is met, the core network device may update the key for the second connection. When the second trigger condition is met, the terminal may update the key for the second connection. In this way, when the terminal accesses the AMF node by using a plurality of access technologies, re-authentication may be performed on the terminal through the first connection on a premise that normal communication that is performed between the terminal and the AMF node through the second connection is not affected, and the keys of the two connections are updated.

DESCRIPTION OF EMBODIMENTS

The following further describes in detail this application with reference to the accompanying drawings. A specific operation method in method embodiments may also be applied to an apparatus embodiment or a system embodiment. In the description of this application, unless otherwise stated, "a plurality of" means two or more than two.

System architectures and service scenarios described in this application are intended to more clearly describe the technical solutions in this application, but are not intended to limit the technical solutions provided in this application. A person of ordinary skill in the art may know that as the system architectures evolve and a new service scenario emerges, the technical solutions provided in this application are applicable to a similar technical problem.

It should be noted that, in this application, the word "example" or "for example" is used to represent giving an example, an illustration, or a description. Any embodiment or design scheme described as "example" or "for example" in this application should not be explained as being more preferable or having more advantages than another embodiment or design scheme. Exactly, use of the word "example" or "for example" or the like is intended to present a relative concept in a specific manner.

Figure 1:
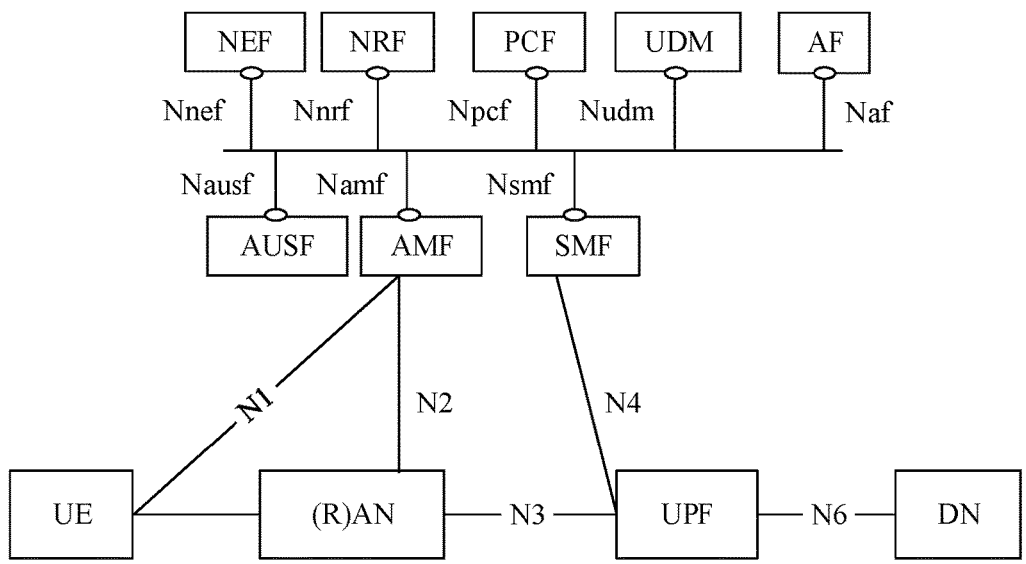
FIG. 1 is a schematic diagram of a possible network architecture according to an embodiment of this application.

Embodiments of this application may be applied to a communications system that supports a terminal in accessing a network by using at least two access technologies. For example, the communications system may be a next-generation wireless communications system, for example, a 5G communications system. FIG. 1 is a schematic diagram of a possible network architecture according to this application. The network architecture includes the following:

AMF node: The AMF node is a network element responsible for mobility management, and may be configured to implement functions other than session management in mobility management entity (MME) functions, for example, functions such as lawful interception and access authorization.

Session management function (SMF) node: The SMF node is configured to allocate a session resource to a user plane.

Authentication server function (AUSF) node: When performing authentication on a terminal, the AUSF is responsible for verifying and transferring a to-be-authenticated parameter and performing authentication on authenticity of the terminal. Main functions include receiving an authentication request sent by a security anchor function (SEAF) node and selecting an authentication method. When an extensible authentication protocol authentication and key agreement (EAP-AKA') authentication method is used, the AUSF node can complete authentication performed by a network side on the terminal.

SEAF node: The SEAF node may be a part of the AMF node, or may be an independent network element. The SEAF node is mainly responsible for initiating an authentication request to the AUSF, and completing authentication performed by the network side on the terminal in an evolved packet system authentication and key agreement (EPS-AKA*) authentication process.

User plane function (UPF) node: The UPF node is an egress of user plane data, and is configured to connect to an external network.

Data network (DN): The DN is a network used to provide external data, for example, Internet (internet).

(Radio) access network ((R)AN) node: The (R)AN may use different access technologies. Currently, there are two types of radio access technologies: a 3GPP access technology (for example, a radio access technology used in a 3G, 4G, or 5G system) and a non-3GPP access technology. The 3GPP access technology is an access technology that complies with a 3GPP standard specification. An access network using the 3GPP access technology is referred to as a radio access network (RAN), and an access network device in a 5G system is referred to as a next-generation node base-station (gNB). The non-3GPP access technology is an access technology that does not comply with the 3GPP standard specification, for example, an air interface technology represented by a WiFi access point (AP).

Terminal: The terminal in this application is a device having wireless receiving and sending functions, and may be deployed on land, including indoor or outdoor, handheld, or in-vehicle. It can also be deployed on water (such as ships) or in the air (such as airplanes, balloons, and satellites). The terminal may include various types of user equipment (UE), mobile phones, tablet computers, computers with wireless receiving and sending functions, wireless data cards, virtual reality (VR) terminal devices, augmented reality (AR) terminal devices, machine type communication (MTC) terminal devices, terminal devices in industrial control, terminal devices in self driving, terminal devices in remote medical, terminal devices in smart grid, terminal devices in transportation safety, terminal devices in a smart city, wearable devices (such as a smartwatch, a smart band, and a pedometer), and the like. In systems using different radio access technologies, names of terminals having similar wireless communication functions may be different. Only for ease of description, in the embodiments of this application, the foregoing apparatuses having wireless receiving and sending communication functions are collectively referred to as terminals.

Specifically, the terminal in this application stores a long-term key and a related function. When performing bi-directional authentication with a core network node (for example, an AMF node, an AUSF node, or a SEAF node), the terminal may verify authenticity of a network by using the long-term key and a related function pair.

Access network device: The access network device in the embodiments of this application is an apparatus that provides a wireless communication function for the terminal. For example, the access network device may be a base station (BS), and the base station may include various forms of macro base stations, micro base stations, relay stations, access points, and the like. In systems using different radio access technologies, names of devices having a base station function may be different. For example, in a 5G system, the device is referred to as a next-generation node base-station, which may be represented as gNB. In a long term evolution (LTE) system, the device is referred to as an evolved NodeB (evolved NodeB, eNB or eNodeB). In a 3rd generation (3G) communications system, the device is referred to as a node B (Node B), and so on. For ease of description, in the embodiments of the present invention, the foregoing apparatuses that provide a wireless communications function for the terminal are collectively referred to as access network devices.

Network exposure function (NEF) node: The NEF node is mainly configured to interact with a third party, so that the third party can indirectly interact with some network elements in a 3GPP network.

Network repository function (NRF) node: The NRF node is configured to discovery a specific network element and maintain a network function (NF).

Policy control function (PCF) node: The PCF node stores a latest quality of service (QoS) rule. A base station may allocate an appropriate resource to a user plane transmission channel based on a QoS rule provided by the SMF node.

Unified data management (UDM) node: The UDM node is configured to store subscription information of a user.

Application function (AF) node: The AF node may be located inside a DN, and belongs to a functional network element deployed in the third party. This network element is mainly used to notify the PCF node of a latest service requirement of a third-party enterprise for an application. The PCF node may generate a corresponding QoS rule based on the service requirement, to ensure that a service provided by a network meets the requirement proposed by the third party.

Figure 2:
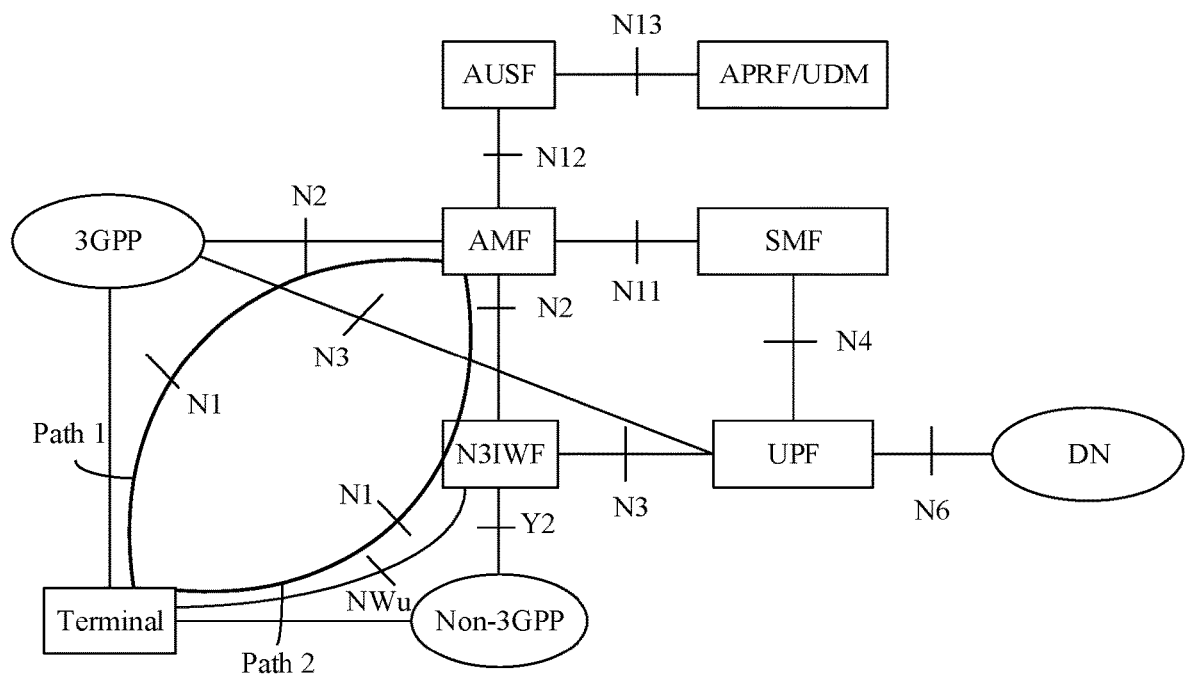
FIG. 2 is a schematic diagram of another possible network architecture according to an embodiment of this application.

In the embodiments of this application, the terminal may access the AMF node by using at least two access technologies. For example, the at least two access technologies include a 3GPP access technology and a non-3GPP access technology. The embodiments of this application further provide a schematic diagram of a possible network architecture, as shown in FIG. 2. The network architecture includes an AMF node, an AUSF node, an SMF node, a UPF node, a UDM node (or an authentication credential storage and processing function (APRF) node), a terminal, and a non-3GPP interworking function (N3IWF) node.

For the AMF node, the AUSF node, the SMF node, the UPF node, the UDM node, and the terminal, refer to the description of FIG. 1. Details are not described herein again.

The N3IWF node is configured to support the terminal in accessing the AMF node by using the non-3GPP access technology.

With reference to the network architecture shown in FIG. 2, the terminal may access the AMF node by using both the 3GPP access technology and the non-3GPP access technology simultaneously. The access network device in the 3GPP access technology may be a base station in a 5G network, a base station in a 4G network, or a base station used in a future telecommunications network. The non-3GPP access technology may be a network access technology used by a non-telecom network, such as a WiFi network or a fixed network. The 3GPP access technology may be simply represented as 3GPP, and the non-3GPP access technology may be simply represented as non-3GPP. A path 1 in FIG. 2 is a path on which the terminal accesses the AMF node by using 3GPP access technology, and a path 2 is a path on which the terminal accesses the AMF node by using non-3GPP access technology. The terminal may access the AMF node by using a gateway corresponding to a corresponding access technology, a function entity jointly deployed with the gateway, or an entity having a gateway function. A gateway corresponding to the non-3GPP technology may be an N3IWF node, or may be a gateway used when the terminal accesses the AMF node by using a fixed network access technology, for example, a BNG (broadband network gateway, fixed network gateway). The entity having a gateway function is a peer end connected to the AMF node, for example, the other end of an N2 interface in the 5G network and the other end of an S1 interface in the 4G network.

When the terminal accesses the AMF node by using both the 3GPP and the non-3GPP access technology simultaneously, if the terminal needs to send a NAS message to the AMF node, in a possible implementation, the NAS message may be split into at least two message blocks. Some message blocks are transmitted by using 3GPP access technology, and some other message blocks are transmitted by using non-3GPP access technology. For example, the NAS message may be divided into five message blocks: 1, 2, 3, 4, and 5. The message blocks 2 and 4 are transmitted by using 3GPP access technology, and the message blocks 1, 3, and 5 are transmitted by using non-3GPP access technology. In another possible implementation, the terminal may transmit an entire NAS message by using 3GPP access technology, and transmit another entire NAS message by using non-3GPP access technology.

First, terms related to the embodiments of this application are explained.

(1) RM State

RM is used to control a terminal and a network. An RM state includes two states: a registration state and a deregistration state.

When the terminal is in the deregistration state, the terminal may attempt to enter the registration state by sending a registration procedure to a core network device (for example, an AMF node). After receiving a registration accept message replied by the AMF node, the terminal enters the registration state. When the terminal is powered off or fails in registration, the terminal returns to the deregistration state.

When the terminal is in the registration state, the AMF node has location information, routing information, and security context information of the terminal, and the terminal has the security context information.

When the terminal is in the deregistration state, the AMF node does not have the location information nor the routing information of the terminal, and both the AMF node and the terminal have the security context information. The security context information includes a NAS key and a related algorithm. If the terminal returns from the registration state to the deregistration state, the terminal not only stores the security context information, but also stores temporary identity information allocated by the AMF node during previous registration, so that the terminal may not initiate an authentication procedure when the terminal registers with the network again, thereby reducing a delay in accessing the network.

(2) CM State

A CM state includes a connected state and an idle state.

When the terminal is in the connected state, there is a communication connection between the terminal and the network, that is, data is being exchanged between the terminal and the AMF node.

When the terminal is in the idle state, there is no communication connection between the terminal and the network, that is, no data is currently exchanged between the terminal and the AMF node.

(3) State Switching

When the terminal has not accessed the network, the terminal is in the idle state and the deregistration state. In this case, there is no security context information between the terminal and an AMF node. The terminal first switches from the idle state to the connected state, and then the terminal may initiate a registration procedure, and switches from the deregistration state to the registration state. In this case, the terminal has the NAS key and the security algorithm. If the terminal does not need to exchange data with the network subsequently, the terminal may return to the idle state, and the terminal is still in the registration state after returning to the idle state.

When the terminal returns from the connected state to the idle state, security context information stored by the terminal is the NAS key and the security algorithm. When the terminal returns from the registration state to a non-registration state, the terminal stores the NAS key, the security algorithm, and temporary identity information allocated by the AMF during the previous registration.

It should be noted that the state switching in this application means that a CM state of the terminal in the core network device returns from one state to another state. For example, switching from the connected state to the idle state means that the CM state of the terminal in the core network device returns from the connected state to the idle state. For example, when the terminal sends a registration request message to the core network device, the terminal is in the connected state. After the core network device sends a registration complete message to the terminal, if the terminal does not immediately send a message to the core network device, or the terminal does not send a message to the core network device within a specific time period controlled by a timer, the terminal returns to the idle state.

In addition, time used for a "switching" action is not limited in the embodiments of this application. To be specific, time required for switching a second connection from the connected state to the idle state may be controlled by a timer, or may be controlled by a switching procedure. This is not limited in this application.

(4) First Access Technology and Second Access Technology

The terminal supports accessing the network by using both the first access technology and the second access technology simultaneously. The first access technology is a 3GPP access technology, and the second access technology is a non-3GPP access technology. Alternatively, the first access technology is a non-3GPP access technology, and the second access technology is a 3GPP access technology. Certainly, this application is not limited thereto. The first access technology and the second access technology may alternatively be another access technology supported when the terminal communicates with the core network device.

A first connection is a connection through which the terminal accesses a first core network device by using the first access technology.

A second connection is a connection through which the terminal accesses a second core network device by using the second access technology.

The terminal using the first connection and the second connection is a same terminal, but the first core network device and the second core network device may be the same or may be different. In this application, an example in which the terminal supports accessing a same core network device by using both the first connection and the second connection simultaneously is used.

In addition, the first connection and the second connection in this application may be direct connections or indirect connections between the terminal and the core network device. For example, the second connection is a connection through which the terminal accesses a gateway device by using the second access technology, and accesses a core network element by using the gateway device. FIG. 2 is used as an example. The terminal may access the AMF node by using the 3GPP access technology. The first connection may be understood as a communication path between the terminal and the AMF node when the terminal uses the 3GPP access technology, that is, the path 1. Alternatively, the terminal may access the AMF node by using the non-3GPP access technology. When the terminal accesses the AMF node by using the non-3GPP access technology, the terminal does not directly communicate with the AMF node, but communicates with the AMF node by using an N3IWF node. The second connection is a connection between the terminal and the N3IWF node and a connection between the N3IWF node and the AMF node, and may also be understood as the path 2.

(5) Re-Authentication

Re-authentication means that: when the core network device finds that a type of parameter is about to be unavailable, for example, a NAS COUNT is about to wrap around, or a trigger condition is met based on a configuration requirement of an operator, the core network device performs authentication on the terminal again. In a process in which the core network device performs re-authentication on the terminal, the core network device exchanges a message with the terminal. The terminal compares a to-be-verified parameter provided by the core network with another parameter generated by the terminal, and the core network device compares a to-be-verified parameter provided by the terminal with another parameter generated by the core network device. If the to-be-verified parameter provided by the core network device is the same as the parameter generated by the terminal, or if the to-be-verified parameter provided by the terminal is the same as the parameter generated by the core network device, authentication verification performed between the terminal and the core network device succeeds.

For example, the authentication verification procedure may be a 5G AKA procedure in a 5G network, an EAP-AKA' procedure, or an EPS AKA procedure in an LTE network.

Optionally, the re-authentication procedure in the embodiments of this application may include an authentication verification procedure and a key activation procedure. To be specific, in the authentication verification procedure, the core network device and the terminal may verify whether to-be-verified information sent by each other is correct. In the key activation procedure, the core network device sends a NAS security mode command (SMC) message to the terminal, and receives a NAS security mode complete (SMP) message from the terminal.

(6) Core Network Device

The core network device is a device in a 3GPP network different from an access network device. The core network device may be an AMF node, an SMF node, or may be a network device such as a SEAF node, an AUSF node, or a UDM node.

The core network device is not limited to a device that verifies a terminal, for example, an AUSF node in a 5G network. Alternatively, the core network device may be a device participating in an authentication procedure, for example, a device (for example, an AMF node) configured to forward a message in the authentication procedure. Optionally, the core network device may further have an independent function, for example, a SEAF function, deployed together with the core network device.

In addition, the core network device that initiates a re-authentication procedure to the terminal may be the same as or different from the core network device that performs authentication verification on the terminal. The authentication verification means that the core network device verifies whether to-be-authenticated information sent by the terminal is correct. For example, in a 5G AKA scenario, the core network device that initiates a re-authentication procedure is an AMF node, or is a SEAF node deployed together with the AMF node. In this scenario, the core network device that initiates the re-authentication procedure may be an AMF node, and the core network device that performs authentication verification on the terminal is a SEAF node in the AMF node. In this case, it may be considered that the core network device that initiates the re-authentication procedure to the terminal is the same as the core network device that performs authentication verification on the terminal, and both are the AMF node. In this scenario, if the SEAF node is not deployed together with the AMF node, that is, the SEAF node is also an independent core network device, the core network device that initiates the re-authentication procedure to the terminal is different from the device that performs authentication verification on the terminal.

For another example, in a 5G EAP-AKA' scenario, the core network device that initiates a re-authentication procedure may be an AMF node, and a device that performs authentication verification on the terminal is an AUSF node. In this case, the core network device that initiates the re-authentication procedure to the terminal is different from the core network device that performs authentication verification on the terminal.

(7) Key

Both a key for the first connection and a key for the second connection are NAS keys. The NAS key includes an encryption key and an integrity protection key. The key for the first connection is used to perform security protection on a message that is transmitted between the terminal and the core network device through the first connection, and the key for the second connection is used to perform security protection on a message that is transmitted between the terminal and the core network device through the second connection.

Figure 3:
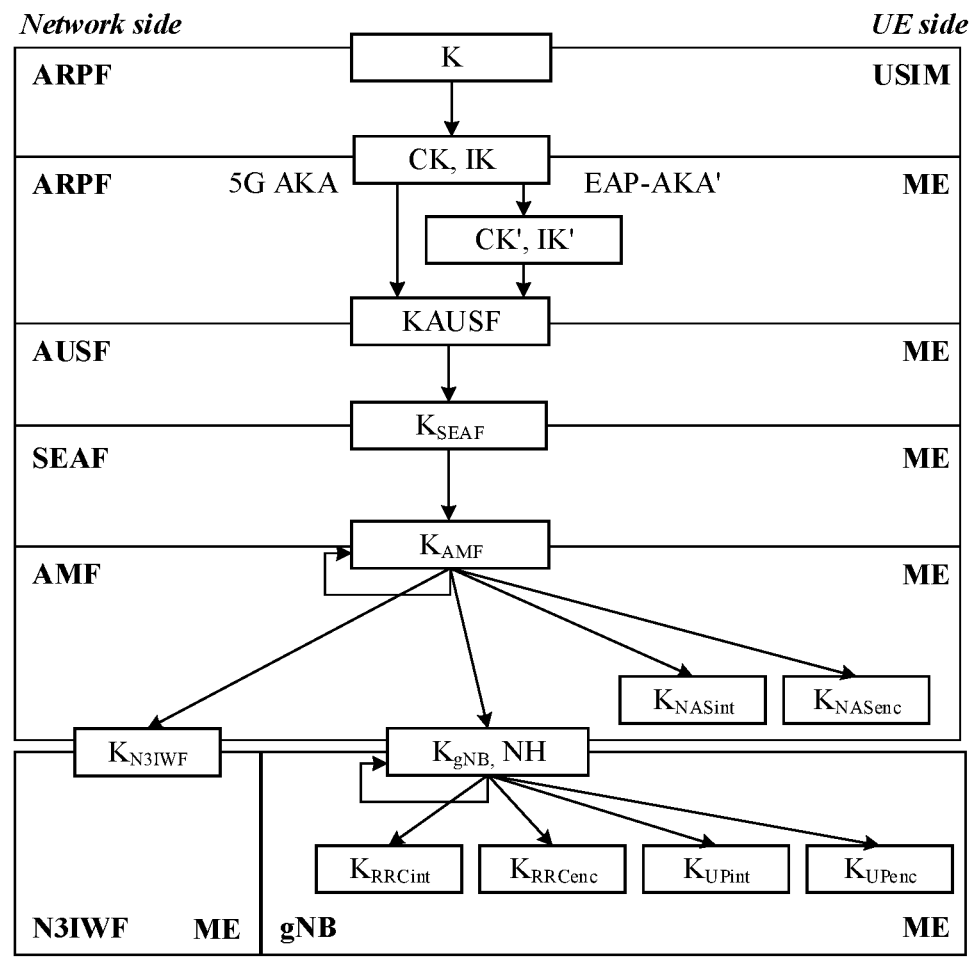
FIG. 3 is a schematic diagram of a key architecture according to an embodiment of this application.

A key architecture in the embodiments of this application is shown in FIG. 3. In FIG. 3, an upper-layer key may be used as a generation parameter of a lower-layer key. Optionally, in a re-authentication process, the key for the first connection and another key used for deriving the first connection may be generated. For example, in FIG. 3, all keys except a first-layer key, K, are updated in the re-authentication process. For example, the key for the first connection may be KNASint, KNASenc, KRRCint, KRRCenc, KUPint, KUPenc, and the like.

Optionally, if an old key needs to be retained in a key update process, the retained old key may be at least one of KNASint, KNASenc, KgNB, NH, KRRCint, KRRCenc, KUPint, KUPenc, or KN3IWF. Optionally, KAMF, KSEAF, or KAUSF are also retained.

Figure 4:
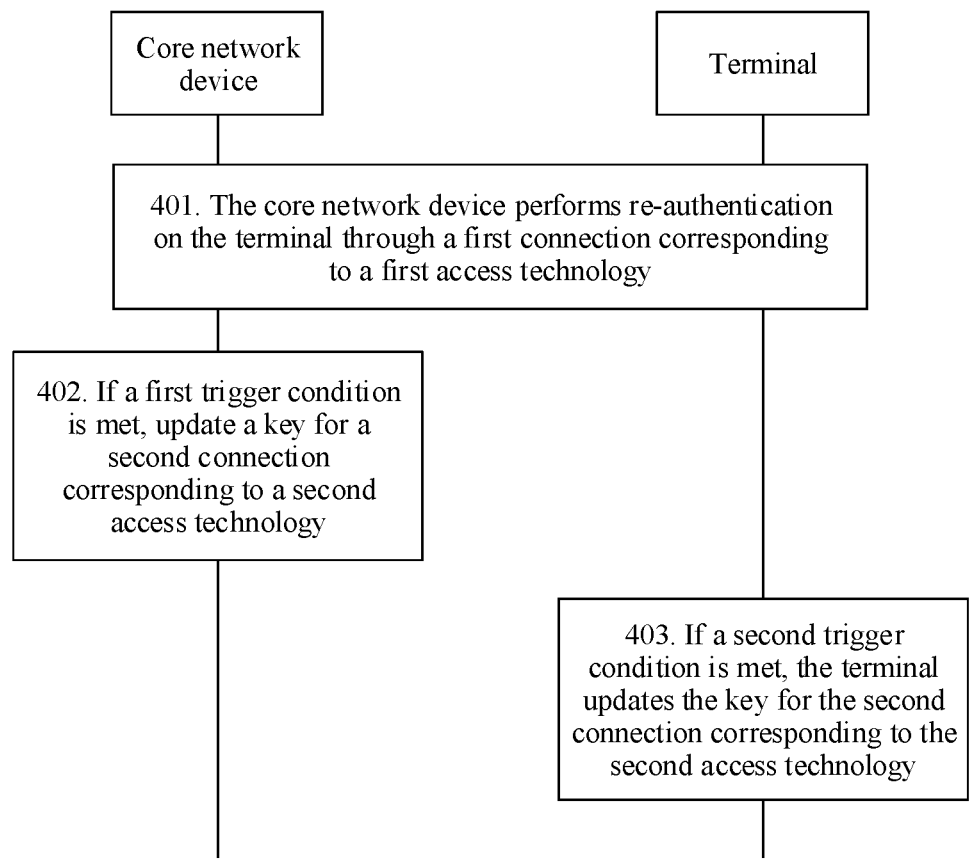
FIG. 4 is a flowchart of a key generation method according to an embodiment of this application.

With reference to FIG. 1 to FIG. 3, an embodiment of this application provides a key update method, applied to a communications system. The communications system includes a core network device and a terminal. The terminal accesses the core network device by using both a first access technology and a second access technology simultaneously. As shown in FIG. 4, the method includes the following steps.

Step 401. The core network device performs re-authentication on the terminal through a first connection corresponding to the first access technology; correspondingly, the terminal performs re-authentication on the core network device through the first connection corresponding to the first access technology.

In a process in which the core network device performs re-authentication on the terminal through the first connection, both the core network device and the terminal may update a key for the first connection. For example, the core network device and the terminal device may generate new keys for the first connection, for example, keys such as KAUSF, KSEAF, KAMF, KNASint, or KNASenc.

Optionally, in a process in which the core network device performs re-authentication on the terminal through the first connection, the core network device may further obtain a first key identifier, where the first key identifier is used to identify an updated key for the first connection. When the core network node is an AMF node, there are the following three methods for obtaining the first key identifier by the AMF node:

Manner 1: The AMF node generates the first key identifier.

Manner 2: The AMF node obtains the first key identifier from another core network device. For example, the first key identifier is obtained from a SEAF node.

Manner 3: The AMF node obtains, from another core network device, information used to generate the first key identifier, and then generates the first key identifier based on the information used to generate the first key identifier.

Optionally, in the re-authentication process, the core network device may send the first key identifier to the terminal.

It may be understood that after receiving the first key identifier, the terminal may update the key for the first connection to a key identified by the first key identifier.

Step 402. If a first trigger condition is met, the core network device updates a key for a second connection corresponding to the second access technology.

Optionally, the first trigger condition may be a state of the second connection, and the state of the second connection may be an idle state or a connected state.

Optionally, the first trigger condition may alternatively be that the second connection is in a deregistration state. If the core network device determines that the second connection is in the deregistration state, it indicates that the core network device and the terminal currently do not use the second connection. In this case, neither the re-authentication process performed on the terminal nor the process of updating the key for the second connection affects use of the second connection by the core network device and the terminal.

Step 403. If a second trigger condition is met, the terminal updates a key for a second connection corresponding to the second access technology.

According to the method provided in this embodiment of this application, the core network device may perform re-authentication on the terminal through the first connection, and the key for the first connection may be updated in the re-authentication process. When the first trigger condition is met, the core network device may update the key for the second connection. When the second trigger condition is met, the terminal may update the key for the second connection. In this way, when the terminal accesses the AMF node by using a plurality of access technologies, re-authentication may be performed on the terminal through the first connection on a premise that normal communication that is performed between the terminal and the AMF node through the second connection is not affected, and the keys of the two connections are updated.

It may be understood that the terminal or the core network device may perform some or all of the steps in the foregoing embodiment. These steps or operations are merely examples. In the embodiments of the present invention, other operations or variations of various operations may be further performed. In addition, the steps may be performed in a sequence different from that presented in the foregoing embodiment, and possibly, not all the operations in the foregoing embodiment need to be performed.

Figure 5:
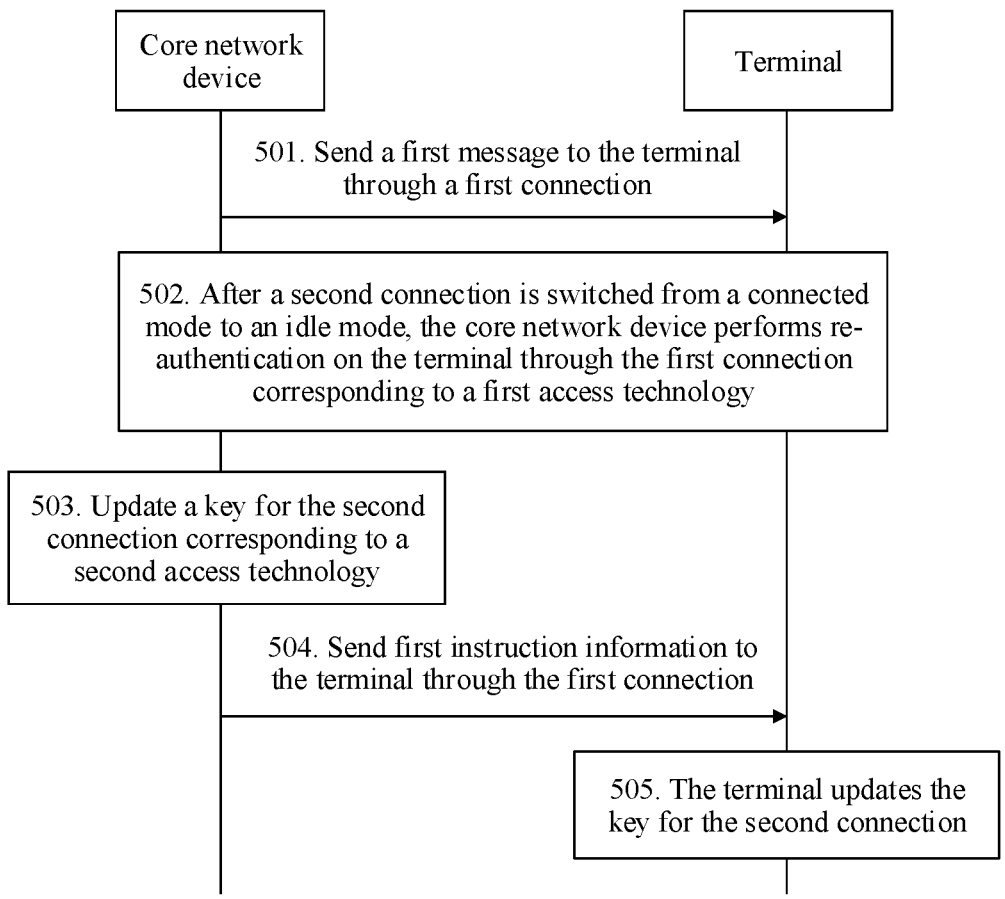
FIG. 5 is a flowchart of another key generation method according to an embodiment of this application.

With reference to the embodiment shown in FIG. 4, in a possible implementation scenario, the first trigger condition is that the second connection is in the idle state. If the core network device determines that the core network device needs to perform re-authentication on the terminal through the first connection, but the second connection is in the connected state at this time, as shown in FIG. 5, the method includes step 501 to step 505.

501. The core network device sends a first message to the terminal through the first connection, where the first message is used to instruct the terminal to suspend using the first connection. Correspondingly, the terminal receives the first message from the core network device through the first connection.

It may be understood that, when the second connection is in the connected state, to avoid impact of a re-authentication process on communication that is performed between the terminal and the core network device through the second connection, re-authentication on the terminal through the first connection may be suspended. After the second connection is switched from the connected state to the idle state, re-authentication is performed on the terminal through the first connection. Due to reasons such as that a NAS COUNT used by the terminal is about to wrap around, the core network device needs to perform re-authentication on the terminal. If the terminal continues to send a NAS message to the core network device through the first connection, the NAS COUNT may wrap around. In this case, the core network device may instruct the terminal to suspend using the first connection. Optionally, if security context of the first connection may be further used once, the core network device may instruct the terminal to send, to the core network device only through the first connection or the second connection, a NAS message protected by using the security context of the existing first connection, before re-authentication is performed.

Step 502. After the second connection is switched from the connected state to the idle state, the core network device performs re-authentication on the terminal through the first connection corresponding to the first access technology. Correspondingly, the terminal performs re-authentication through the first connection corresponding to the first access technology.

Optionally, after the second connection is switched from the connected state to the idle state, if the first connection is still in the connected state, the method of step 502 is performed.

Optionally, after the second connection is switched from the connected state to the idle state, if the first connection is in the idle state, the core network device may perform re-authentication on the terminal through the first connection corresponding to the first access technology or the second connection corresponding to the second access technology. It may be understood that because both the connections are in the idle state, the terminal may access the network again by using either connection. When this case occurs, it may be considered that the second connection becomes the first connection in this embodiment of this application, and the original first connection becomes the second connection.

Optionally, in a process of performing re-authentication on the terminal through the first connection, the core network device may further update the key for the second connection, and obtain a third key identifier, where the third key identifier is used to identify an updated key for the second connection. It should be noted that if the first connection and the second connection share a set of NAS keys, the third key identifier is the same as the first key identifier, or it may be understood that the core network device does not need to obtain the third key identifier, and the first key identifier may be further used to identify the updated key for the second connection.

In another possible implementation, after detecting that the second connection returns to the idle state, the terminal may send a message to the core network device through the first connection or the second connection, to trigger the core network device to initiate re-authentication on the terminal. In still another possible implementation, when the first connection is in the idle state, after the terminal receives an end message of a procedure through the second connection, and before the second connection is switched to the idle state, the terminal may send a message to the core network device, to trigger the core network device to perform re-authentication on the terminal device through the second connection. In this case, it may be considered that the second connection becomes the first connection in this application, and the original first connection becomes the second connection.

Alternatively, the key for the second connection may be updated after the core network device performs re-authentication on the terminal through the first connection, that is, step 503 may be further performed after step 502.

Step 503. The core network device updates the key for the second connection corresponding to the second access technology.

Specifically, if the second connection is in the idle state, the core network device may update the key for the second connection corresponding to the second access technology after re-authentication.

Optionally, the core network device may further obtain the third key identifier.

Step 504. The core network device sends first instruction information to the terminal through the first connection.

The first connection is used to instruct the terminal to update the key for the second connection.

Optionally, the first instruction information may be the first key identifier or the second key identifier. Alternatively, the first instruction information may be the first key identifier and the second key identifier.

Step 505. The terminal updates the key for the second connection.

It may be understood that the second trigger condition is that the terminal receives the first instruction information from the core network device through the first connection.

Optionally, if the first instruction information is the first key identifier, the terminal may update the key for the second connection to a key indicated by the first key identifier; or if the first instruction information is the second key identifier, the terminal may update the key for the second connection to a key indicated by the second key identifier.

It should be noted that in any embodiment of this application, if the core network device instructs, by sending a key identifier to the terminal, the terminal to update the key for the second connection, the terminal may update the key for the second connection to a key indicated by the key identifier sent by the core network device.

According to the key update method provided in this embodiment of this application, if determining that re-authentication needs to be performed on the terminal through the first connection, the core network device further needs to determine the state of the second connection, performs re-authentication on the terminal through the first connection only when the second connection is in the idle state, and updates the keys for the first connection and the second connection. Because the second connection is in the idle state, the key update process does not affect normal use of the second connection by the terminal and the core network device.

It may be understood that the terminal or the core network device may perform some or all of the steps in the foregoing embodiment. These steps or operations are merely examples. In the embodiments of the present invention, other operations or variations of various operations may be further performed. In addition, the steps may be performed in a sequence different from that presented in the foregoing embodiment, and possibly, not all the operations in the foregoing embodiment need to be performed.

With reference to the method shown in FIG. 4, optionally, in another possible implementation scenario, the first trigger condition is that the second connection is in the connected state. When the core network device determines that the core network device needs to perform re-authentication on the terminal through the first connection, if the second connection is in the connected state, the core network device may suspend using the second connection, and then perform re-authentication on the terminal through the first connection, to update the keys for the first connection and the second connection.

Optionally, in another possible implementation scenario, a timer may be preconfigured for the AMF node and the terminal. After the core network device performs re-authentication on the terminal through the first connection and updates the key for the first connection, if the second connection is in the connected state, the core network device and the terminal may start the timer. After the core network and the terminal determine that the timer expires, the old key for the second connection cannot be used. Alternatively, after the core network device performs re-authentication on the terminal through the first connection and updates the key for the first connection, if the second connection is in the connected state, the core network device starts the timer after re-authentication is completed; and the terminal automatically starts the timer. After the core network determines that the timer expires, the old key for the second connection cannot be further used. Similarly, after determining that the timer expires, the terminal cannot further use the old key for the second connection. Alternatively, in a process in which the core network device performs re-authentication on the terminal through the first connection, or after completing re-authentication, the core network device sends the first key identifier to the terminal, and then the core network device and the terminal each set mark information, to mark that if the second connection is switched to the idle state, the core network device and the terminal update the key for the second connection.

Figure 6:
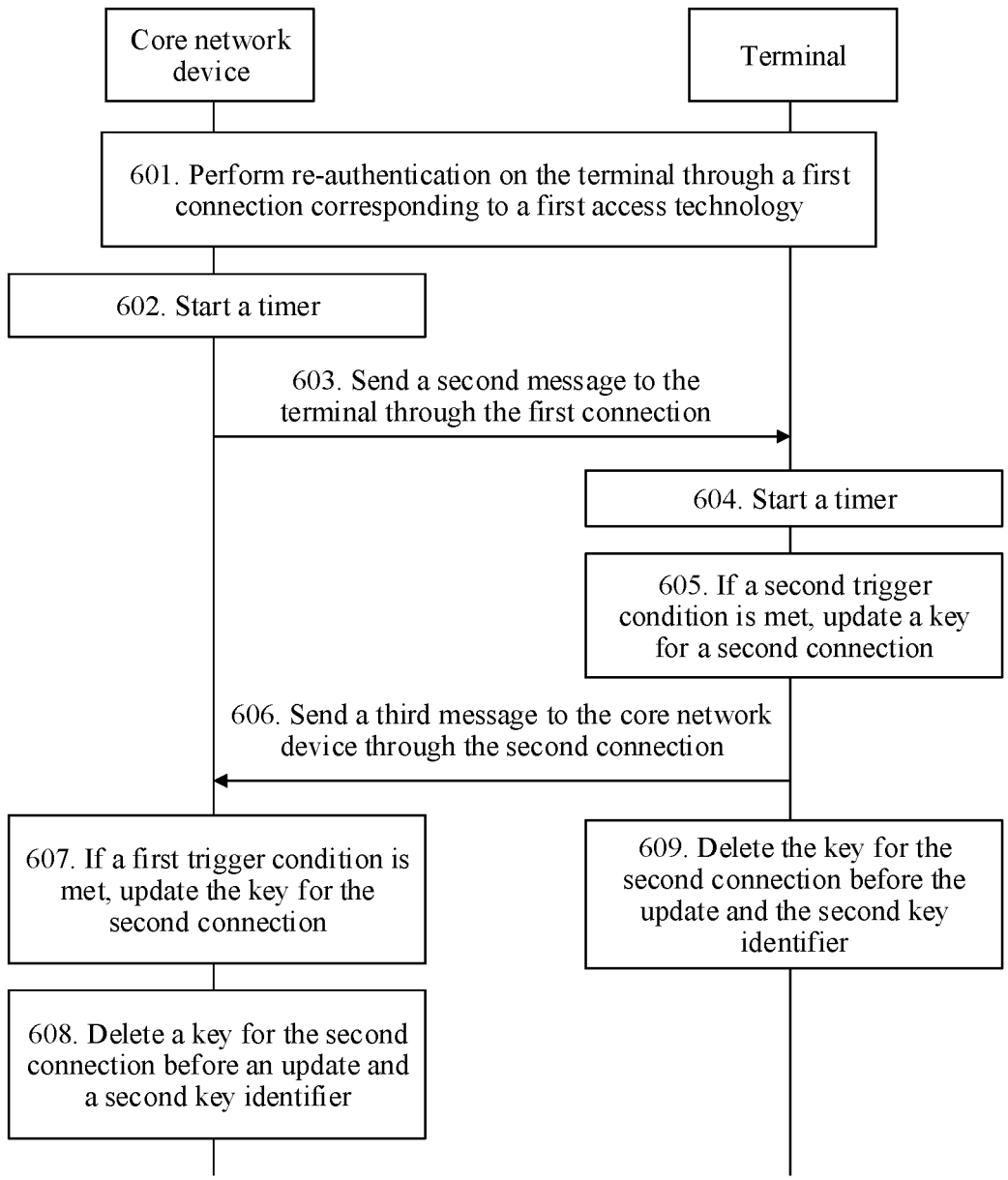
FIG. 6 is a flowchart of another key generation method according to an embodiment of this application.

With reference to FIG. 4, optionally, in another possible implementation scenario, the first trigger condition is a timer or mark information. As shown in FIG. 6, the method includes the following steps.

Step 601. The core network device performs re-authentication on the terminal through the first connection corresponding to the first access technology. Correspondingly, the terminal performs re-authentication on the core network device through the first connection corresponding to the first access technology.

Optionally, in a process in which the core network device performs re-authentication on the terminal through the first connection, the core network device obtains a first key identifier, and retains a second key identifier and the key for the second connection that is used before update, where the first key identifier is used to identify an updated key for the first connection, and the second key identifier is used to identify the key for the second connection that is used before update.

Correspondingly, in a process of performing re-authentication through the first connection, the terminal retains the second key identifier and the key for the second connection that is used before update, where the second key identifier is used to identify the key for the second connection that is used before update.

It should be noted that, in this embodiment of this application, the key for the second connection that is used before update is an old key for the second connection, and the updated key for the second connection is a new key for the second connection. The new key for the second connection is related to a key generated in a re-authentication process of the terminal device through the first connection.

Step 602. The core network device starts a timer.

A value that makes the timer expire may be a value of a timer that is currently used, for example, a value of a timer related to a non-3GPP access technology, for example, a value of a deregistration timer, or may be a value of a timer related to a 3GPP access technology, for example, a value of a periodical update timer (periodic registration timer). When starting the timer, the core network device may directly use a value of a timer that is counting down, may set a value less than a value of a timer that is counting down, or may set a value unrelated to a value of an existing timer. Alternatively, an operator may preconfigure a value at which the timer expires, so that the value at which the timer expires represents valid duration of the key for the second connection that is used before update, that is, duration for which the key for the second connection that is used before update can still be used.

Step 603. The core network device sends a second message to the terminal through the first connection. Correspondingly, the terminal receives the second message.

Optionally, the second message carries instruction information, and the instruction information is used to instruct the terminal to start the timer. Optionally, the second message may be a NAS SMC message.

Optionally, the second message further carries a first key identifier or a second key identifier.

Step 604. The terminal starts a timer.

Optionally, if the second message received by the terminal carries the first key identifier or the second key identifier, the terminal may determine that the key for the second connection needs to be updated, and then start the timer; or if the second message received by the terminal carries the instruction information, the terminal may start the timer according to the instruction information.

Optionally, a value at which the timer started by the terminal expires may be the same as or different from a value at which the timer started by the core network device expires. If the values are different, the value at which the timer started by the terminal expires may be less than the value at which the timer started by the core network device expires. The value at which the timer started by the terminal expires may be a value of a timer that is currently used, for example, a value of a timer related to a non-3GPP access technology, for example, a value of a deregistration timer, or may be a value of a timer related to a 3GPP access technology, for example, a value of a periodical update timer (periodic registration timer). When starting the timer, the core network device may directly use a value of a timer that is counting down, may set a value less than a value of a timer that is counting down, or may set a value unrelated to a value of an existing timer. Alternatively, the operator may preconfigure a value at which the timer expires, so that the value at which the timer expires represents valid duration of the key for the second connection that is used before update, that is, duration for which the key for the second connection that is used before update can still be used.

Step 605. If the second trigger condition is met, the terminal updates the key for the second connection.

Optionally, the second trigger condition may be that the timer of the terminal expires. After the timer expires, the terminal may discard the key for the second connection that is used before update, or the terminal updates, based on a new key generated in a re-authentication process, the key used for the second connection. For example, a NAS stratum key newly generated in the re-authentication process is used as the new key, or a new NAS stratum key is derived by using a key newly generated in the re-authentication process, for example, Kamf.

It should be noted that an execution sequence of step 605 and step 606 is not limited in this application. Step 605 may be performed before step 606, or may be performed after step 606 and step 607. In FIG. 6, that step 605 is performed first is used as an example.

Step 606. The terminal sends a third message to the core network device through the second connection. Correspondingly, the core network device receives the third message from the terminal through the second connection.

The third message is a NAS message, and may be, for example, a registration request message or a session establishment request message. There are at least the following several cases in which the terminal sends the third message to the core network device through the second connection:

Case 1: Before the timer expires, the terminal sends the third message to the core network device through the second connection, where security protection is performed on the third message by using the key for the second connection that is used before update.

Case 2: After the timer expires, the terminal sends the third message to the core network device through the second connection, where security protection is not performed on the third message. It may be understood that, in this case, if the timer expires, the terminal may not actively update the key for the second connection. Optionally, the terminal may send the third message through the second connection, and then perform step 607. After step 607, the core network device may send, to the terminal through the second connection, a message used to update and activate a new key. For example, the message carries instruction information for instructing the terminal to update the key for the second connection or a third key identifier, and then the terminal performs step 605. Corresponding to this case, the second trigger condition in step 605 is that the terminal receives the instruction information or the third key identifier. Alternatively, in this case, the terminal may update the key for the second connection after sending the third message to the core network device, that is, the second trigger condition is that the timer of the terminal expires, that is, the terminal performs step 605 after step 606.

Case 3: After the timer expires, the terminal sends the third message to the core network device through the second connection, where security protection is performed on the third message by using the updated key for the second connection.

Optionally, in Case 3, after the timer expires, the terminal may actively update the key for the second connection, that is, step 605 is performed after step 606. Corresponding to this case, the second trigger condition in step 605 is that the timer of the terminal expires.

Step 607. If the first trigger condition is met, the core network device updates the key for the second connection.

Corresponding to the three cases in step 605, there are also three types of first trigger conditions:

Corresponding to Case 1, a first type of trigger condition is: the core network device receives, before the timer expires, a third message that is sent by the terminal through the second connection, and security verification that is performed by the core network device on the third message by using the key for the second connection that is used before update succeeds.

Optionally, in this case, the terminal does not update the key for the second connection before sending the third message to the core network device. Therefore, after updating the key for the second connection, the core network device may instruct the terminal to update the key for the second connection, for example, update the key for the second connection in a subsequent key activation procedure, for example, a NAS SMC process.

Optionally, in a process in which the core network device processes the third message, the timer expires, and the core network device may send a failure message to the terminal. The failure message may carry a failure cause value, and the cause value is used to notify the terminal that the key for the second connection that is used before update expires.

Optionally, in a process in which the core network device processes the third message, if the timer expires, security protection may be performed, by using the updated key for the second connection, on a message subsequently sent by the core network device to the terminal. Because the terminal updates the key for the second connection after the timer of the terminal expires, the terminal may perform, by using the updated key for the second connection, security verification on the message received through the second connection after the timer expires.

Corresponding to Case 2, a second type of trigger condition is: after the timer expires, the core network device receives a third message that is sent by the terminal through the second connection and on which security protection is not performed. In this case, the core network device enables the updated key for the second connection in a subsequent key activation procedure, for example, a NAS SMC procedure.

Corresponding to Case 3, a third type of trigger condition is: after the timer expires, the core network device receives a third message that is sent by the terminal through the second connection, where security protection is performed on the third message by using the updated key for the second connection. Correspondingly, the core network device performs security verification on the third message by using the updated key for the second connection.

Optionally, a fourth type of trigger condition is further included: the timer expires, and the core network device does not receive, before the timer expires, a third message that is sent by the terminal through the second connection.

For the fourth type of trigger condition, that is, the terminal does not send the third message to the core network device from a time when the timer of the core network device is started to a time when the timer of the core network device expires, the core network device discards the key for the second connection that is used before update, after the timer of the core network device expires. Optionally, the core network device further updates the key for the second connection. Optionally, the core network device instructs the terminal to update the key for the second connection.

Optionally, after the timer expires, the second connection does not immediately return to the idle state. In a time period from a time when the timer expires to a time when the second connection returns to the idle state, if the terminal sends a registration request message to the core network device, the core network device may perform re-authentication on the terminal.

It should be noted that, before the timer expires, if the core network device has updated the key for the second connection, the core network device may close the timer. Similarly, if the terminal updates the key for the second connection before the timer expires, the terminal may also close the timer.

Step 608. The core network device deletes the key for the second connection that is used before update and the second key identifier.

It may be understood that, in step 607, after updating the key for the second connection, the core network device may perform step 608.

Step 609. The terminal deletes the key for the second connection before update and the second key identifier.

It may be understood that, in step 605, after updating the key for the second connection, the terminal may perform step 609.

According to the key update method provided in this embodiment of this application, when the core network determines that the core network needs to perform re-authentication through the first connection, if the second connection is in the connected state, the core network device may directly perform re-authentication on the terminal through the first connection, and may retain the key for the second connection that is used before update in a re-authentication process. In this way, even if the core network device performs re-authentication on the terminal through the first connection, and updates the key for the first connection, when the core network device and the terminal communicate with each other through the second connection, the key for the second connection that is used before update may still be used, and normal communication through the second connection is not affected. In addition, in the method, the first connection and the second connection are decoupled. When performing authentication on the terminal through the first connection, the core network device does not need to detect the state of the second connection. After the timer expires, both the core network device and the terminal can actively update the key for the second connection, thereby reducing overheads of signaling interaction between the core network device and the terminal, and simplifying implementation.

It may be understood that the terminal or the core network device may perform some or all of the steps in the foregoing embodiment. These steps or operations are merely examples. In the embodiments of the present invention, other operations or variations of various operations may be further performed. In addition, the steps may be performed in a sequence different from that presented in the foregoing embodiment, and possibly, not all the operations in the foregoing embodiment need to be performed.

Figure 7:
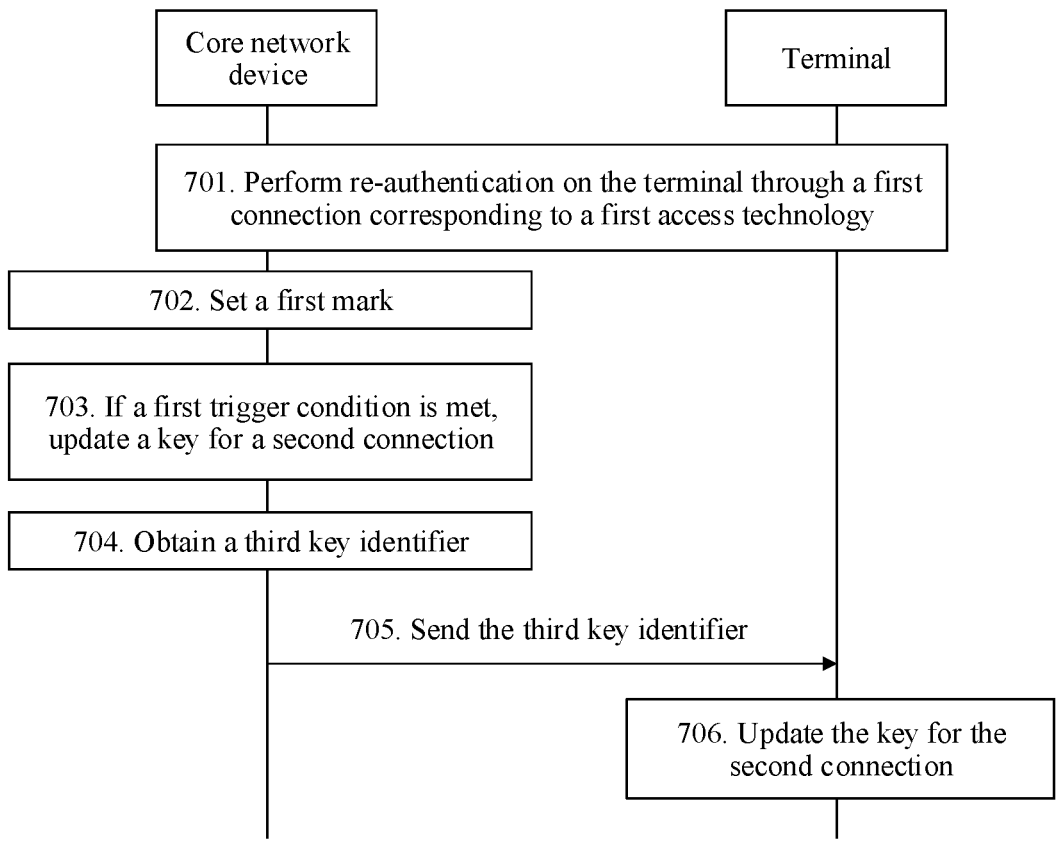
FIG. 7 is a flowchart of another key generation method according to an embodiment of this application.

Optionally, with reference to FIG. 4, in another possible implementation scenario, when the core network determines that the core network needs to perform re-authentication on the terminal through the first connection, as shown in FIG. 7, the method includes the following steps.

Step 701. The core network device performs re-authentication on the terminal through the first connection corresponding to the first access technology; correspondingly, the terminal performs re-authentication on the core network device through the first connection corresponding to the first access technology.

Step 702. The core network device sets a first mark. Optionally, the second connection is in the connected state.

The first mark is used to mark that the core network device has performed re-authentication on the terminal through the first connection, or is used to instruct to update the key for the second connection.

It should be noted that, if the first mark is used to mark that the core network device has performed re-authentication on the terminal through the first connection, it also implicitly marks that the core network device needs to update the key for the second connection.

Step 703. If a first trigger condition is met, the core network device updates the key for the second connection.

Optionally, in a process in which the core network device performs re-authentication on the terminal through the first connection, the second connection may return to the idle state. Based on this, the first trigger condition is that the second connection is in the idle state, and the core network device determines that the first mark exists.

Alternatively, after the core network device performs re-authentication on the terminal through the first connection and the second connection is still in the connected state, the first trigger condition in this case is that the core network device determines that the first mark exists, and a corresponding method for updating the key for the second connection by the core network device is: if the second connection is in the connected state, first suspending, by the core network device, using the second connection, and then updating the key for the second connection. Alternatively, before replying to the terminal with a message through the second connection, the core network device first exchanges a key update and activation procedure with the terminal device to update the key for the second connection. Then the core network device sends the reply message to the terminal. For example, the key for the second connection is updated in a NAS SMC procedure.

It should be noted that, if the second connection returns to the idle state in a process in which the core network device performs re-authentication on the terminal through the first connection, the core network device may update the key for the second connection when the core network device receives again a NAS message, for example, a registration request message, that is sent by the terminal through the second connection, and the core network device determines that the first mark exists. For example, the key for the second connection is updated by exchanging the key update and activation procedure with the terminal device.

Optionally, the core network device may determine, based on key identifier information carried in a message sent by the terminal device, a specific set of keys used by the terminal device. In this case, the core network device determines keys based on the key identifier, and verifies, by using the keys corresponding to the key identifier, the message sent by the terminal. After the verification succeeds, the set of keys are used as updated keys for the second connection.

It may be understood that: after updating the key for the second connection, the core network device may resume using the second connection; and when subsequently sending a NAS message through the second connection, the core network device may perform integrity protection on the NAS message by using the updated key for the second connection.

Step 704. The core network device obtains a third key identifier.

The third key identifier is used to identify the updated key for the second connection.

Optionally, if the first connection and the second connection share a set of NAS keys, the core network device may not obtain the first key identifier in the re-authentication process, but obtains the third key identifier after updating the key for the second connection. In this case, the third key identifier may be used to identify the updated key for the first connection and the updated key for the second connection.

Optionally, if the first connection and the second connection share a set of NAS keys, the core network device may not obtain the third key identifier, but directly uses the first key identifier obtained in the re-authentication process. In other words, the first key identifier obtained in the re-authentication process may be used to identify the updated key for the first connection and the updated key for the second connection.

Step 705. The core network device sends the third key identifier to the terminal. Correspondingly, the terminal receives the third key identifier from the core network device.

It should be noted that, after the core network device updates the key for the second connection, if the second connection is in the connected state, the core network device may send the third key identifier to the terminal through the second connection, where integrity protection is performed on the third key identifier by using the updated key for the second connection; if the second connection is in the idle state, the core network device may send the third key identifier to the terminal through the first connection, and integrity protection is performed on the third key identifier by using the updated key for the first connection.

Optionally, if the first connection and the second connection share a set of NAS keys, and the core network device does not obtain the third key identifier, the core network device may send the first key identifier to the terminal.

Optionally, the core network device may further send, to the terminal, at least one parameter used to update the key for the second connection, for example, an encryption algorithm and an integrity protection algorithm that are selected when the core network device updates the key for the second connection, and an access technology type.

Step 706. The terminal updates the key for the second connection.

It may be understood that in this case, the second trigger condition is that the terminal receives the third key identifier from the core network device.

Optionally, the third key identifier may be carried in a NAS message. If the terminal receives the third key identifier through the second connection, the terminal may update the key for the second connection based on the third key identifier, that is, update the key for the second connection to a key identified by the third key identifier, and perform integrity protection verification on the NAS message by using the updated key for the second connection. After the verification succeeds, the updated key for the second connection becomes valid. If the terminal receives the third key identifier through the first connection, the terminal may perform integrity protection verification on the NAS message by using the updated key for the second connection, and update the key for the second connection after the verification succeeds.

According to the key generation method provided in this embodiment of this application, regardless of whether the second connection is in the idle state, the core network device may first update the key for the first connection. After the key for the first connection is updated, if the second connection returns to the idle state, the key for the second connection may be updated after the terminal sends a registration request message to the core network device through the second connection next time. If the second connection is still in the connected state, to avoid that the core network device and the terminal perform security protection still by using the key for the second connection that is used before update when transmitting a message to each other through the second connection and therefore security verification on the message fails, the core network device may suspend using the second connection, that is, first suspend NAS message exchange that is performed between the core network device and the terminal through the second connection, and then update the key for the second connection. After the update, the NAS message exchange performed between the core network device and the terminal may be resumed through the second connection. In this case, security protection is performed on a NAS message by using the updated key for the second connection. After the core network device performs re-authentication on the terminal through the first connection, a failure of security verification on a message that is transmitted through the second connection is avoided.

It may be understood that the terminal or the core network device may perform some or all of the steps in the foregoing embodiment. These steps or operations are merely examples. In the embodiments of the present invention, other operations or variations of various operations may be further performed. In addition, the steps may be performed in a sequence different from that presented in the foregoing embodiment, and possibly, not all the operations in the foregoing embodiment need to be performed.

Figure 8:
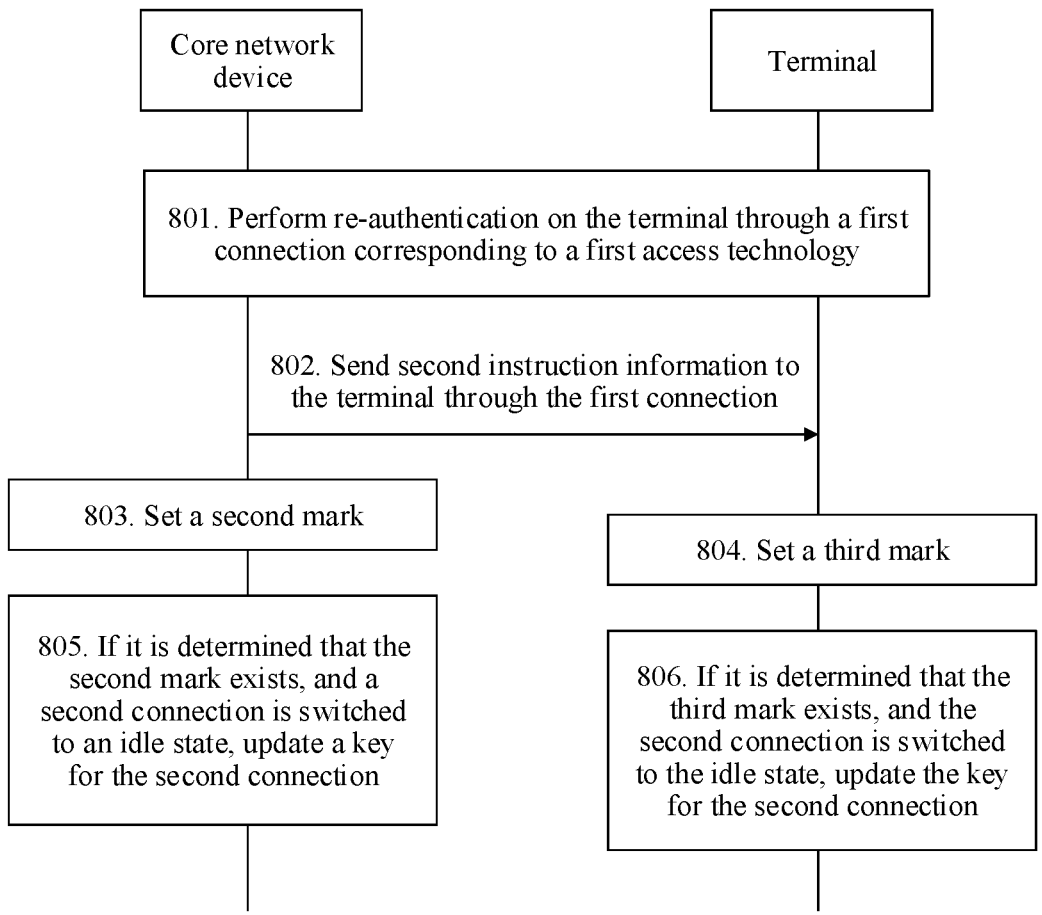
FIG. 8 is a flowchart of another key generation method according to an embodiment of this application.

With reference to FIG. 4, in the previous possible implementation scenario, when the core network determines that the core network needs to perform re-authentication on the terminal through the first connection, if the second connection is in the connected state, an embodiment of this application further provides another possible implementation. As shown in FIG. 8, the method includes the following steps.

Step 801. The core network device performs re-authentication on the terminal through the first connection corresponding to the first access technology; correspondingly, the terminal performs re-authentication on the core network device through the first connection corresponding to the first access technology.

Step 802. The core network device sends second instruction information to the terminal through the first connection. Correspondingly, the terminal receives the second instruction information from the core network device.

The second instruction information is used to instruct the terminal to update a key for the second connection.

In this implementation method, an update occasion of the key for the second connection is not limited. To be specific, whether the terminal device updates the key immediately after receiving the second instruction information, or updates the key after a period of time after receiving the second instruction information is not limited. This method emphasizes that the terminal performs an action of updating the key for the second connection after receiving the second instruction information.

Step 803. The core network device sets a second mark.

The second mark is used to instruct to update the key for the second connection.

It should be noted that an execution sequence of step 802 and step 803 is not limited in this application. The two steps may be performed simultaneously, or either of the two steps is performed first.

Step 804. The terminal sets a third mark.

The third mark is used to instruct to update the key for the second connection.

Step 805. If the core network device determines that the second mark exists and the second connection is switched to the idle state, the core network device updates the key for the second connection.

It may be understood that, in this case, the first trigger condition is that the core network device determines that the second mark exists, and the second connection is switched to the idle state.

Step 806. If the terminal determines that the third mark exists, and the second connection is switched to the idle state, the terminal updates the key for the second connection.

It may be understood that in this case, the second trigger condition is that the terminal determines that the third mark exists, and the second connection is switched to the idle state.

Optionally, the terminal may not set the third mark. After updating the key for the second connection, the core network device may send instruction information to the terminal, to instruct the terminal to update the key for the second connection.

Alternatively, after the second connection is switched to the idle state, the terminal may not update the key for the second connection temporarily. When the terminal needs to send a message to the core network device through the second connection, if it is determined that the third mark exists, the terminal updates the key for the second connection.

It may be understood that after the terminal updates the key for the second connection, integrity protection may be performed, by using the updated key for the second connection, on a NAS message that is sent by the terminal to the core network device through the second connection.

According to the key update method provided in this embodiment of this application, when the core network device determines that the core network device needs to perform re-authentication on the terminal through the first connection, if the second connection is in the connected state, the core network device may first perform re-authentication on the terminal through the first connection. After re-authentication, the core network device may set the second mark, and the terminal may set the third mark. After the second connection is switched to the idle state, both the core network device and the terminal may update the key for the second connection based on the marks set by the core network device and the terminal, thereby reducing signaling overheads generated in a process of updating the key for the second connection.

It may be understood that the terminal or the core network device may perform some or all of the steps in the foregoing embodiment. These steps or operations are merely examples. In the embodiments of the present invention, other operations or variations of various operations may be further performed. In addition, the steps may be performed in a sequence different from that presented in the foregoing embodiment, and possibly, not all the operations in the foregoing embodiment need to be performed.

Figure 9:
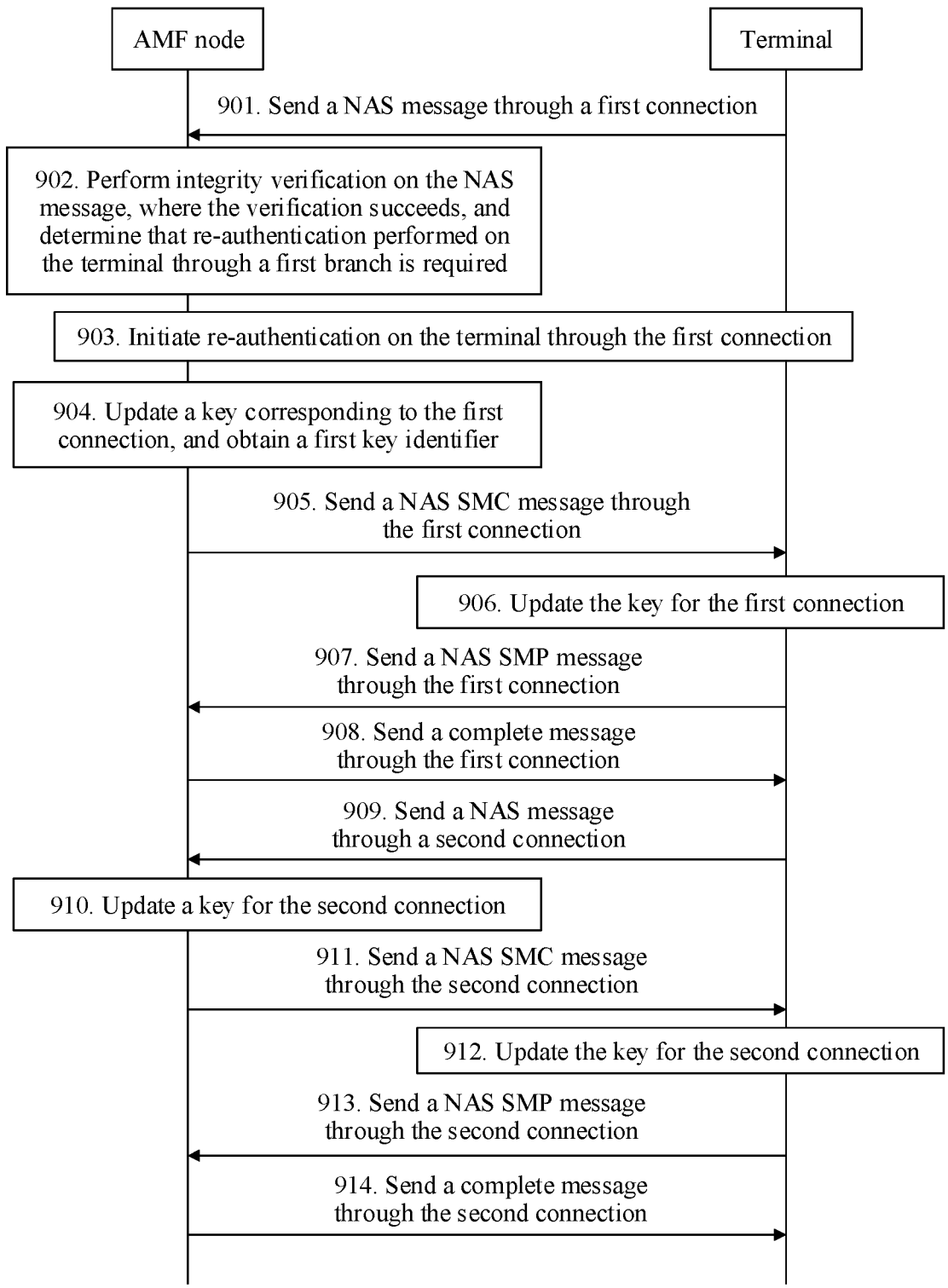
FIG. 9 is a flowchart of another key generation method according to an embodiment of this application.

The key generation method provided in the embodiments of this application is described below with reference to a specific scenario. With reference to FIG. 4 and FIG. 6, in an implementation scenario corresponding to FIG. 6, as shown in FIG. 9, the method specifically includes the following steps.

Step 901. A terminal sends a NAS message to an AMF node through a first connection. Correspondingly, the AMF node receives the NAS message through the first connection.

For example, the NAS message may be a registration request message, a service request message, or a PDU session establishment request message, or may be another NAS message. This is not limited in this application.

The NAS message carries a key identifier used to identify a key for the first connection, and the NAS message is protected by using the key for the first connection.

Step 902. The AMF node performs integrity verification on the NAS message, where the verification succeeds, and determines that the AMF node needs to perform re-authentication on the terminal through the first connection.

The AMF node determines the key for the first connection based on the key identifier carried in the NAS message.

After verifying integrity of the NAS message by using the key for the first connection that is determined based on the key identifier, where the verification succeeds, the AMF node may determine whether re-authentication needs to be performed on the terminal. For example, when determining that a NAS COUNT used by the terminal is about to wrap around, the AMF node determines that re-authentication needs to be performed on the terminal. Alternatively, the AMF node may determine, based on configuration information of an operator, whether re-authentication needs to be performed on the terminal. Certainly, this application is not limited to the two listed methods for determining whether re-authentication needs to be performed on the terminal.

Step 903. The AMF node initiates re-authentication on the terminal through the first connection. Correspondingly, the terminal performs re-authentication through the first connection.

The re-authentication includes an authentication verification procedure and a key activation procedure.

Step 904. The AMF node updates the key corresponding to the first connection, and obtains a first key identifier.

The first key identifier may be obtained in an authentication process, and the first key identifier is used to identify an updated key for the first connection.

It should be noted that, if the first connection and the second connection use different keys, after updating the key for the first connection, the AMF node may delete a key for the first connection that is used before update, and retain a key for the second connection and a second key identifier, where the second key identifier is used to identify a key for the second connection that is used before update; or if the first connection and the second connection share a set of keys, when the AMF node updates the key for the first connection, optionally, the AMF node still needs to retain, for the second connection, the key for the first connection that is used before update and a second key identifier. The second key identifier is used to identify the key for the second connection that is used before update. It may be understood that, the key for the second connection that is used before update is the same as the key for the first connection that is used before update. Specifically, if the second connection is in a connected state, in a method in which the AMF node sets identification information or a timer value, the AMF node still needs to retain, for the second connection, the key for the first connection that is used before update and the second key identifier.

Step 905. The AMF node sends a NAS SMC message to the terminal through the first connection. Correspondingly, the terminal receives the NAS SMC message from the AMF node through the first connection.

The NAS SMC message is equivalent to the second message in step 603. Optionally, the NAS SMC message carries the first key identifier, the second key identifier, or indication information, where the indication information is used to indicates the terminal to start a timer.

Optionally, if the NAS SMC message received by the terminal carries the instruction information that is used to instruct the terminal to start the timer, the terminal starts the timer. Alternatively, if the terminal determines that the received NAS SMC message carries the first key identifier or the second key identifier, the terminal may start the timer.

Alternatively, when the timer method is used, even if the NAS SMC message does not carry the first key identifier, the second key identifier, or the instruction information, the terminal may start the timer after verifying that integrity protection of the NAS SMC is correct or after sending a NAS SMP message. Starting the timer may be performed by the terminal in an extremely short time after the terminal verifies that the integrity protection of the NAS SMC message is correct or after the terminal sends the NAS SMP message. For example, the timer is started immediately after the NAS SMC message is verified, or is started immediately after the NAS SMP is sent. In this method, the first key identifier has been transferred to the terminal in the authentication procedure.

It should be noted that the AMF node may alternatively start the timer before performing step 905, or start the timer after step 908.

A value that makes the timer expire is valid duration of the key for the second connection that is used before update. For example, it is assumed that the first connection and the second connection share a set of keys. Before the timer expires, a key for the first connection that is used before update may still be used by the second connection; after the timer expires, the key for the first connection that is used before update cannot be used to perform security protection on a message that is transmitted between the AMF node and the terminal through the second connection.

Step 906. The terminal updates the key for the first connection.

It may be understood that, in the re-authentication process, the terminal receives the NAS SMC message from the AMF node through the first connection, and updates the key corresponding to the first connection.

After updating the key for the first connection, the terminal may delete the key for the first connection that is used before update, and retain the key for the second connection and the second key identifier. Deleting the key for the first connection that is used before update means that the key cannot be used by the first connection again. This action is related only to the first connection and is unrelated to the second connection.

Step 907. The terminal sends a NAS SMP message to the AMF node through the first connection. Correspondingly, the AMF node receives the NAS SMP message.

The NAS SMP node performs integrity protection by using the updated key for the first connection.

It should be noted that step 904 to step 907 may also be understood as a process in which the core network device performs re-authentication on the terminal through the first connection.

Step 908. The AMF node sends a complete message to the terminal through the first connection; correspondingly, the terminal receives the complete message from the AMF node.

The complete message is a response message of the NAS message in step 901. For example, if the NAS message in step 901 is a registration request message, the NAS message is a registration complete message.

Step 909. The terminal sends a NAS message to the AMF node through the second connection. Correspondingly, the AMF node receives the NAS message through the second connection.

The NAS message carries the second key identifier, and the NAS message is protected by using the key for the second connection that is used before update.

Optionally, the NAS message further carries the first key identifier.

Similarly, the NAS message may alternatively be a registration request message, a service request message, or a PDU session establishment request message. Certainly, this application is not limited thereto.

The NAS message is equivalent to the third message in step 606. For a case in which the terminal sends the NAS message to the AMF node through the second connection, refer to the description of step 606. Details are not described herein again.

Step 910. The AMF node updates the key for the second connection.

The AMF node can update the key for the second connection only when a first trigger condition is met. For a description of the first trigger condition, refer to the related description of step 607. Details are not described herein again.

Optionally, the AMF node may obtain a third key identifier corresponding to the updated key for the second connection, where the third key identifier is used to identify the updated key for the second connection. Alternatively, if the first connection and the second connection share a set of NAS keys, the AMF node may not generate the third key identifier, but uses the first key identifier to identify the updated key for the first connection and the updated key for the second connection.

It should be noted that after updating the key for the second connection, the AMF node may delete the key for the second connection that is used before update and the key identifier used to identify the key for the second connection that is used before update. Alternatively, the AMF node may select, based on different trigger conditions, to delete the key for the second connection that is used before update and the key identifier used to identify the key for the second connection that is used before update, before the key for the second connection is updated.

Step 911. The AMF node sends a NAS SMC message to the terminal through the second connection. Correspondingly, the terminal receives the NAS SMC message from the AMF node through the second connection.

If the first connection and the second connection share a set of keys, the NAS SMC message carries the first key identifier.

Optionally, if the first connection and the second connection use different keys, the NAS SMC message carries the third key identifier.

Step 912. The terminal updates the key for the second connection.

Optionally, after receiving the NAS SMC message, the terminal updates the key for the second connection. Optionally, the key for the second connection may be updated based on the first key identifier or the third key identifier carried in the NAS SMC message.

Optionally, after the terminal starts the timer, if the timer of the terminal does not expire, the terminal stops the timer after updating the key for the second connection.

After updating the key for the second connection, the terminal may delete the key for the second connection that is used before update and the key identifier used to identify the key for the second connection that is used before update.

Step 913. The terminal sends a NAS SMP message to the AMF node through the second connection. Correspondingly, the AMF node receives the NAS SMP message through the second connection.

The integrity protection of the NAS SMP message is performed based on the updated key.

Optionally, after the core network device starts the timer, if the timer of the core network device does not expire, the core network device stops the timer after updating the key for the second connection.

Step 914. The AMF node sends a complete message to the terminal through the second connection. Correspondingly, the terminal receives the complete message through the second connection.

The complete message is a response message of the NAS message in step 901. For example, if the NAS message in step 901 is a registration request message, the complete message is a registration complete message.

It may be understood that the terminal or the core network device may perform some or all of the steps in the foregoing embodiment. These steps or operations are merely examples. In the embodiments of the present invention, other operations or variations of various operations may be further performed. In addition, the steps may be performed in a sequence different from that presented in the foregoing embodiment, and possibly, not all the operations in the foregoing embodiment need to be performed.

Figure 10:
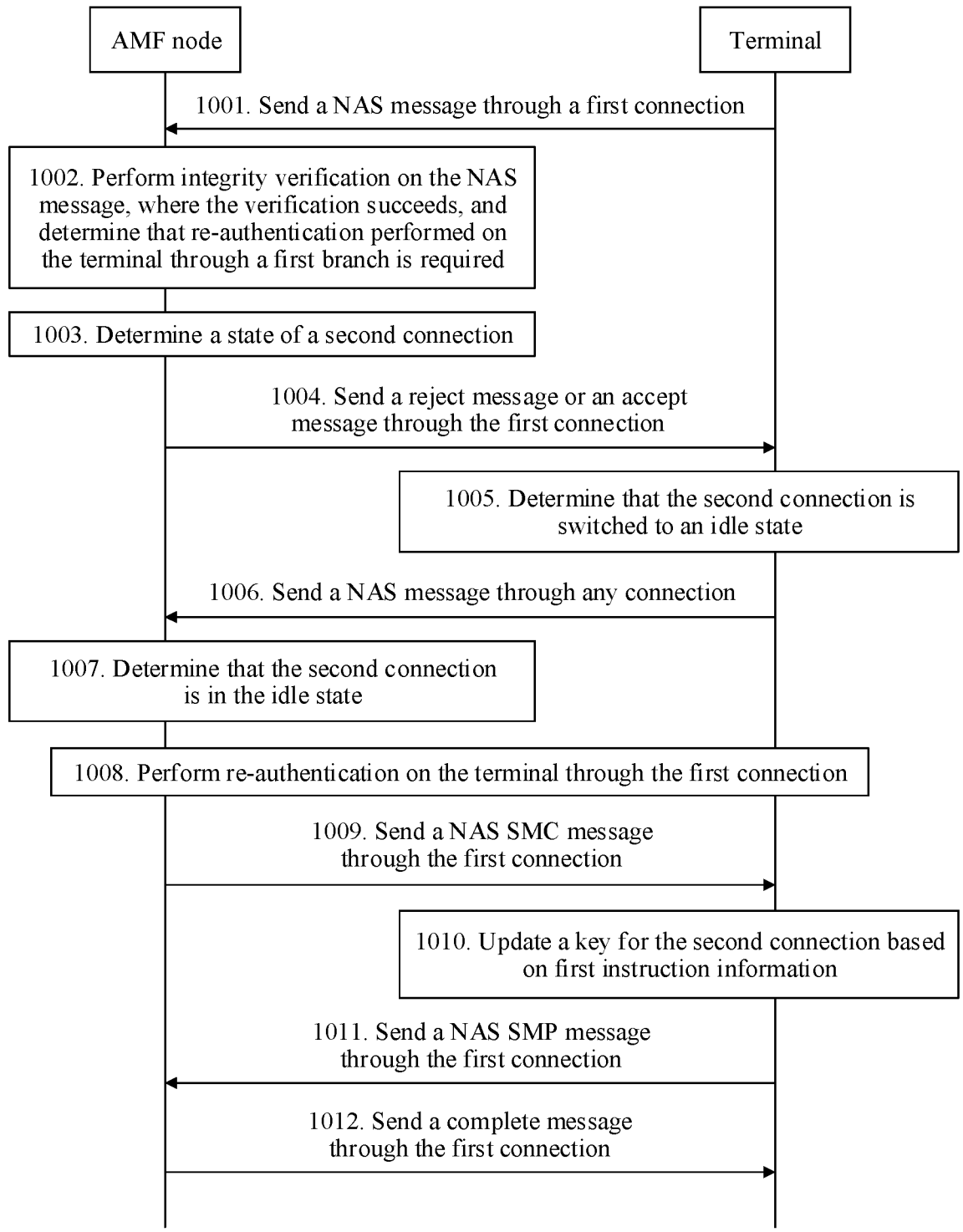
FIG. 10 is a flowchart of another key generation method according to an embodiment of this application.

Optionally, in the implementation scenario corresponding to FIG. 5, when the AMF node determines that the AMF node needs to perform re-authentication on the terminal through the first connection, the AMF node needs to determine a state of the second connection, and can perform re-authentication on the terminal through the first connection only when the state of the second connection is the idle state. As shown in FIG. 10, the method includes step 1001 to step 1012.

Step 1001 to step 1002 are the same as step 901 to step 902, and details are not described herein again.

Step 1003. The AMF node determines the state of the second connection.

When the AMF node determines that the AMF node needs to perform re-authentication on the terminal, a re-authentication method used when the second connection is in the connected state is different from an authentication method used when the second connection is in the idle state or the non-registration state. Therefore, the AMF node needs to determine whether the second connection is in the connected state.

Optionally, for example, the terminal supports accessing the AMF node by using both a 3GPP access technology and a non-3GPP access technology simultaneously. The AMF node may first determine whether the terminal accesses the AMF node by using both the 3GPP access technology and the non-3GPP access technology simultaneously. If the terminal accesses the AMF node by using both the 3GPP access technology and the non-3GPP access technology simultaneously, it indicates that the second connection exists between the AMF node and the terminal, and then whether the second connection of the terminal is in the connected state is determined.

To quickly determine whether the second connection is in the connected state, the AMF node may first determine whether the second connection of the terminal is in the registration state. If determining that the second connection of the terminal is in the deregistration state, the AMF node may determine that the second connection of the terminal cannot be in the connected state. If determining that the second connection of the terminal is in the registration state, the AMF node further determines whether the second connection of the terminal is in the connected state.

There are at least the following three methods for the AMF node to determine whether the terminal accesses the AMF node by using two access technologies simultaneously:

(1) The NAS message in step 1001 carries indication information used to indicate that the second connection of the terminal is in the registration state, and the AMF node may determine, based on the indication information, that the second connection of the terminal is in the registration state, that is, the terminal accesses the AMF node by using two access technologies.

In this method, the AMF node may directly determine the state of the second connection of the terminal based on the received indication information. This is convenient and fast, and the AMF node does not need to perform other query.

(2) The AMF node determines, by querying a state machine of the terminal that is maintained by the AMF node, that the terminal still has another registration state associated with another access technology other than the access technology corresponding to the first connection.

In this method, the AMF node may determine the state of the second connection by using a simple query operation, and the terminal does not need to additionally add, to a NAS message, indication information used to indicate the state of the second connection.

(3) The AMF node stores instruction information used to instruct the terminal to use two access technologies simultaneously for access.

For example, when the terminal has accessed the AMF node by using an access technology (for example, a 3GPP access technology), if the AMF node determines that the terminal successfully accesses the AMF node by using another access technology (for example, a non-3GPP access technology), the AMF node may set an identifier in context of the terminal. The identifier is used to indicate a quantity of access technologies by using which the terminal currently accesses the AMF node. For example, when the identifier is 0, it indicates that the terminal accesses the AMF node by using one access technology. When the identifier is 1, it indicates that the terminal accesses the AMF node by using two access technologies simultaneously, or indicates that the terminal is in a dual-registration state. The dual-registration state is a state in which the terminal registers with the AMF node by using two access technologies.

For another example, the AMF node may set indication information for a file shared by two access technologies, to indicate that content in the shared file is shared by the two access technologies. Before the content in the file is deleted or changed, it needs to be determined whether the content in the file is being used. The content in the file may be a NAS key and a related security algorithm shared by the two access technologies. The AMF node may determine, based on indication information corresponding to the file, that the terminal accesses the AMF node by using the two access technologies simultaneously.

In addition, there are at least three following possible implementations for the AMF node to determine whether the second connection of the terminal is in the connected state:

(1) The AMF node determines that the AMF node is communicating with the terminal through the second connection.

For example, the AMF node is sending a NAS message to the terminal through the second connection, or the AMF node is paging the terminal through the second connection.

(2) The AMF node determines, by querying a state machine of the terminal that is maintained by the AMF node, that the second connection of the terminal is in the connected state.

(3) The AMF node determines, by using indication information stored in the AMF node, that the second connection of the terminal is in the connected state.

For example, if the AMF node discovers an identifier that is stored by the AMF node and that indicates that the terminal is in the dual-registration state or a dual-connected state, for example, discovers an identifier that is 1, the AMF node determines that the second connection of the terminal is in the connected state.

For another example, if the AMF node finds that indication information corresponding to a file stored in the AMF node indicates that content in the file is shared by two access technologies, and the content in the file cannot be changed, it indicates that the content in the file is being used by the second connection, and the AMF node may further determine that the second connection of the terminal is in the connected state.

In this embodiment, an example in which the state of the second connection is the connected state is used for description.

Step 1004. The AMF node sends a reject message or an accept message to the terminal through the first connection.

The first message in step 501 may be the reject message or the accept message in this step. The reject message indicates that the AMF node rejects the NAS message sent by the terminal in step 1001, for example, rejects the registration request message sent by the terminal. Optionally, the reject message carries a cause value, and the cause value is used to notify the terminal that the reject cause is that the second connection is in the connected state. In this case, re-authentication cannot be performed on the terminal. Optionally, the cause value is further used to indicate that integrity verification performed by the AMF node on the NAS message sent by the terminal in step 1101 succeeds.

Optionally, if a NAS COUNT corresponding to the first connection does not wrap around temporarily, the AMF node further allows the terminal to continue to send a specified quantity of NAS messages, or the terminal sends a periodic registration message to the AMF node through the first connection, the AMF node may send an accept message to the terminal through the first connection.

The accept message carries re-authentication flag bit information, and the re-authentication flag bit information is used to notify the terminal that re-authentication needs to be performed on the terminal. However, because the second connection is in the connected state, re-authentication cannot be initiated temporarily. After the terminal receives a re-authentication flag bit, an action of the terminal is limited. For example, a re-authentication identifier may be used to instruct the terminal to suspend using the first connection, or the terminal can send user plane data only through the first connection, or the terminal can send a specified quantity of (for example, one) NAS messages only through the first connection (which means that the security context of the first connection may further be used once), or the terminal may send, only through the first connection, a registration request message on which integrity protection is not performed.

The re-authentication flag bit information may alternatively be timer information. If re-authentication is not performed on the terminal before the timer expires, the AMF node causes the terminal to be in the deregistration state. Optionally, the AMF node deletes all security context of the terminal, so that the terminal needs to perform re-authentication when accessing a network next time.

Step 1005. The terminal determines that the second connection is switched to the idle state.

Step 1006. The terminal sends a NAS message to the AMF node by using any connection. Correspondingly, the AMF node receives the NAS message. The connection for sending the NAS message becomes the first connection in the present invention.

Optionally, the NAS message may be a registration request message.

If the terminal receives the reject message in step 1004, the terminal may send the NAS message to the AMF node by using any connection.

If the terminal receives the accept message in step 1004, and a re-authentication flag bit indicates that the terminal may send a specified quantity of NAS messages through the first connection, the terminal may send, to the AMF node through the first connection, one NAS message on which integrity protection is performed. If the re-authentication flag bit indicates that the terminal may send a registration request message on which security protection is not performed, the terminal may send, to the AMF node through the first connection or the second connection, the registration request message on which security protection is not performed.

It may be understood that if the AMF node receives a NAS message on which integrity protection is performed, the AMF node first performs integrity protection verification on the NAS message.

Step 1005 and step 1006 are optional steps, that is, after step 1004, step 1007 may be directly performed.

Step 1007. The AMF node determines that the second connection is in the idle state.

For a method for determining the state of the second connection by the AMF node, refer to the related description of step 1003. Details are not described herein again.

Step 1008. The AMF node performs re-authentication on the terminal through the first connection.

Optionally, if the terminal sends a NAS message to the AMF node through the second connection in step 1006, the AMF node may perform re-authentication on the terminal through the second connection in this step. The following uses an example in which the AMF node performs re-authentication on the terminal through the first connection for description.

Optionally, in this step, the AMF node may update the key for the first connection and the key for the second connection, and the terminal may update the key for the first connection. Optionally, if the first connection and the second connection share a set of NAS keys, the AMF node may obtain a first key identifier in a process of performing re-authentication on the terminal, where the first key identifier is used to identify an updated key for the first connection and an updated key for the second connection.

Alternatively, if the first connection and the second connection separately use different NAS keys, the AMF node may obtain the first key identifier in the process of performing re-authentication on the terminal. Optionally, the AMF node may further obtain a third key identifier. In this case, the first key identifier is used to identify the updated key for the first connection, and the third key identifier is used to indicate the updated key for the second connection.

Step 1009. The AMF node sends a NAS SMC message to the terminal. Correspondingly, the terminal receives the NAS SMC message.

Optionally, the NAS SMC message may carry the first instruction information in step 504.

The first instruction information is used to instruct the terminal to update the key for the second connection.

Optionally, the first instruction information may be the first key identifier or the second key identifier. Alternatively, the first instruction information may be the first key identifier and the second key identifier.

Integrity protection may be performed on the NAS SMC message by using the updated key for the first connection, and the terminal may perform integrity protection verification on the NAS SMC message by using the updated key for the first connection.

Step 1010. The terminal updates the key for the second connection based on the first instruction information.

Step 1011. The terminal sends a NAS SMP message to the AMF node through the first connection; correspondingly, the AMF node receives the NAS SMP message through the first connection.

Integrity protection is performed on the NAS SMP message by using the updated key for the first connection.

Optionally, the terminal may further send a NAS SMP message to the AMF node through the second connection. In this case, integrity protection is performed on the NAS SMP message by using the updated key for the second connection.

Step 1012. The AMF node sends a complete message to the terminal through the first connection. Correspondingly, the terminal receives the complete message from the AMF node through the first connection.

The complete message is a response message of the NAS message in step 1001. For example, if the NAS message in step 1001 is a registration request message, the complete message is a registration complete message.

It may be understood that if the terminal subsequently sends the NAS message to the terminal through the second connection, integrity protection may be performed on the NAS message by using the updated key for the second connection.

It may be understood that the terminal or the core network device may perform some or all of the steps in the foregoing embodiment. These steps or operations are merely examples. In the embodiments of the present invention, other operations or variations of various operations may be further performed. In addition, the steps may be performed in a sequence different from that presented in the foregoing embodiment, and possibly, not all the operations in the foregoing embodiment need to be performed.

Figure 11:
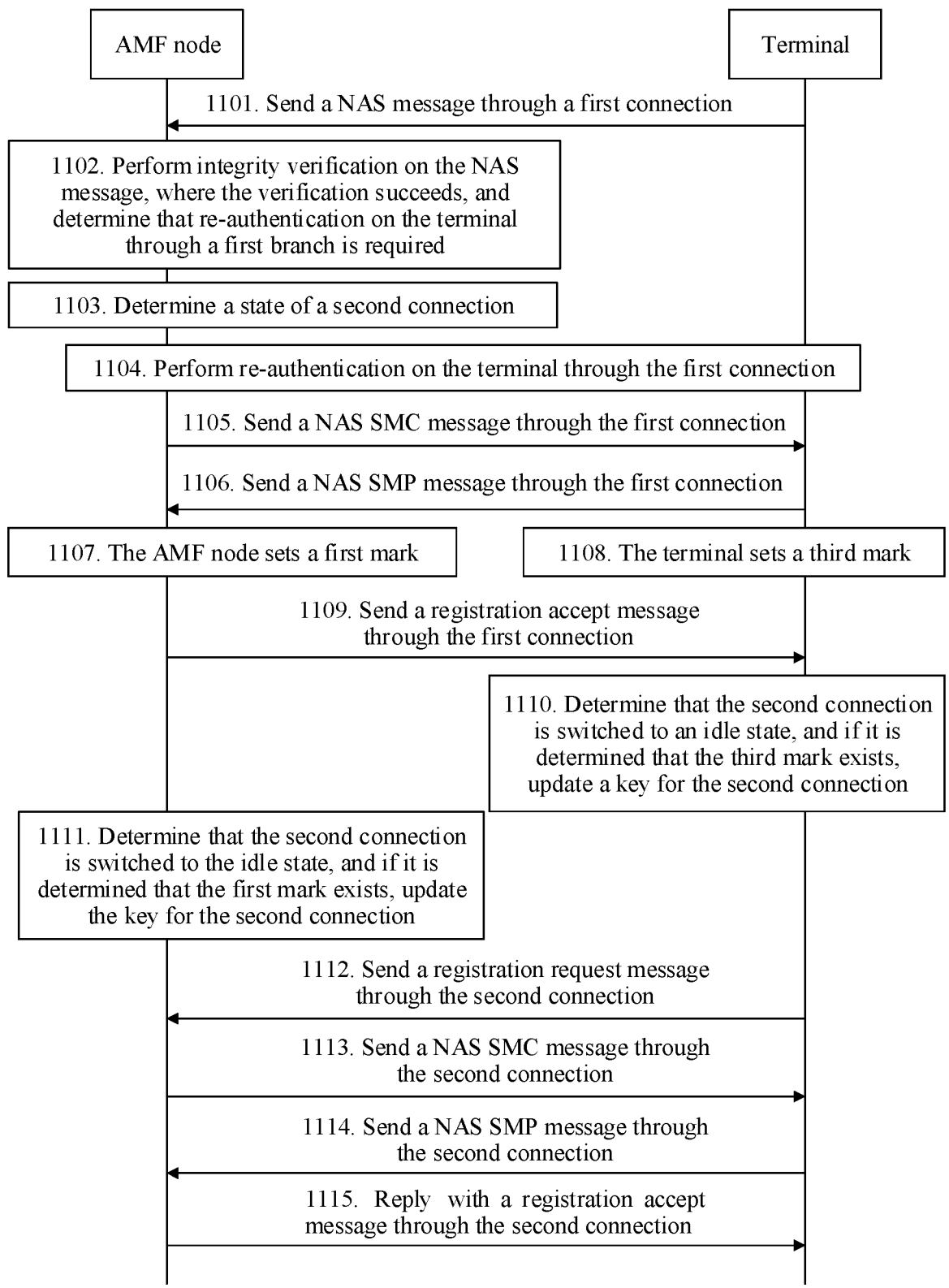
FIG. 11 is a flowchart of another key generation method according to an embodiment of this application.

Optionally, in the implementation scenarios corresponding to FIG. 7 and FIG. 8, when the AMF node determines that the AMF node needs to perform re-authentication on the terminal through the first connection, if a second branch is in the connected state, the core network device may first perform re-authentication on the terminal through the first connection. As shown in FIG. 11, the method includes step 1101 to step 1115.

Step 1101 to step 1103 are the same as step 1001 to step 1003, and details are not described herein again.

Step 1104. The AMF node performs re-authentication on the terminal through the first connection.

Both the AMF node and the terminal may update a key for the first connection in a re-authentication process.

Step 1105. The AMF node sends a NAS SMC message to the terminal through the first connection. Correspondingly, the terminal receives the NAS SMC message from the AMF node through the first connection.

Integrity protection is performed on the NAS SMC message by using an updated key for the first connection, and the terminal may perform integrity protection verification on the NAS SMC message by using the updated key for the first connection.

Optionally, the NAS SMC message carries the second instruction information in step 802, where the second instruction information is used to instruct the terminal to update a key for a second connection, or the second instruction information may be used to instruct the terminal not to update a key for a second connection.

Step 1106. The terminal sends a NAS SMP message to the AMF node through the first connection.

Step 1107. The AMF node sets a first mark.

The first mark is used to mark that the core network device has performed re-authentication on the terminal through the first connection, or is used to instruct to update the key for the second connection.

Step 1108. The terminal sets a second mark.

The second mark is used to instruct to update the key for the second connection.

Optionally, step 1108 needs to be performed only when the second instruction information received by the terminal is used to instruct the terminal to update the key for the second connection.

Step 1109. The AMF node sends a registration accept message to the terminal through the first connection. Correspondingly, the terminal receives the registration accept message from the AMF node through the first connection.

Step 1110. The terminal determines that the second connection is switched to an idle state. If determining that a third mark exists, the terminal updates the key for the second connection.

Optionally, if the terminal does not set the third mark, step 1111 needs to be performed when the second connection is switched to the idle state.

Step 1111. The AMF node determines that the second connection is switched to the idle state. If determining that the first mark exists, the AMF node updates the key for the second connection.

Optionally, if the second connection is still in the connected state, the AMF node may suspend using the second connection. Alternatively, when processing the NAS message that is sent by the terminal through the second connection, if the AMF node discovers the first mark, the AMF node may suspend using the second connection, then update the key for the second connection and the key identifier used to identify the updated key for the second connection, and send the NAS SMC message to the terminal through the second connection. The NAS SMC message carries the key identifier used to identify the updated key for the second connection, so that the terminal may update the key for the second connection based on the key identifier. It may be understood that, after both the AMF node and the terminal update the key for the second connection, the AMF node may resume using the second connection, and perform, by using the updated key for the second connection, integrity protection on the NAS message transmitted through the second connection.

Step 1112. The terminal sends a registration request message to the AMF node through the second connection. Correspondingly, the AMF node receives the registration request message from the terminal through the second connection.

Integrity protection is performed on the registration request message by using the updated key for the second connection.

Step 1113. The AMF node sends a NAS SMC message to the terminal through the second connection. Correspondingly, the terminal receives the NAS SMC message from the AMF node through the second connection.

The NAS SMC message carries a key identifier used to identify the updated key for the second connection. Optionally, the NAS SMC message may further carry at least one parameter used to update the key for the second connection.

Step 1114. The terminal sends a NAS SMP message to the AMF node through the second connection. Correspondingly, the AMF node receives the NAS SMP message from the terminal through the second connection.

Integrity protection is performed on the NAS SMP message by using the updated key for the second connection.

Step 1115. The AMF node replies to the terminal with a registration accept message through the second connection. Correspondingly, the terminal receives the registration accept message from the AMF node through the second connection.

Integrity protection is performed on the registration accept message by using the updated key for the second connection.

It may be understood that the terminal or the core network device may perform some or all of the steps in the foregoing embodiment. These steps or operations are merely examples. In the embodiments of the present invention, other operations or variations of various operations may be further performed. In addition, the steps may be performed in a sequence different from that presented in the foregoing embodiment, and possibly, not all the operations in the foregoing embodiment need to be performed.

Figure 12:
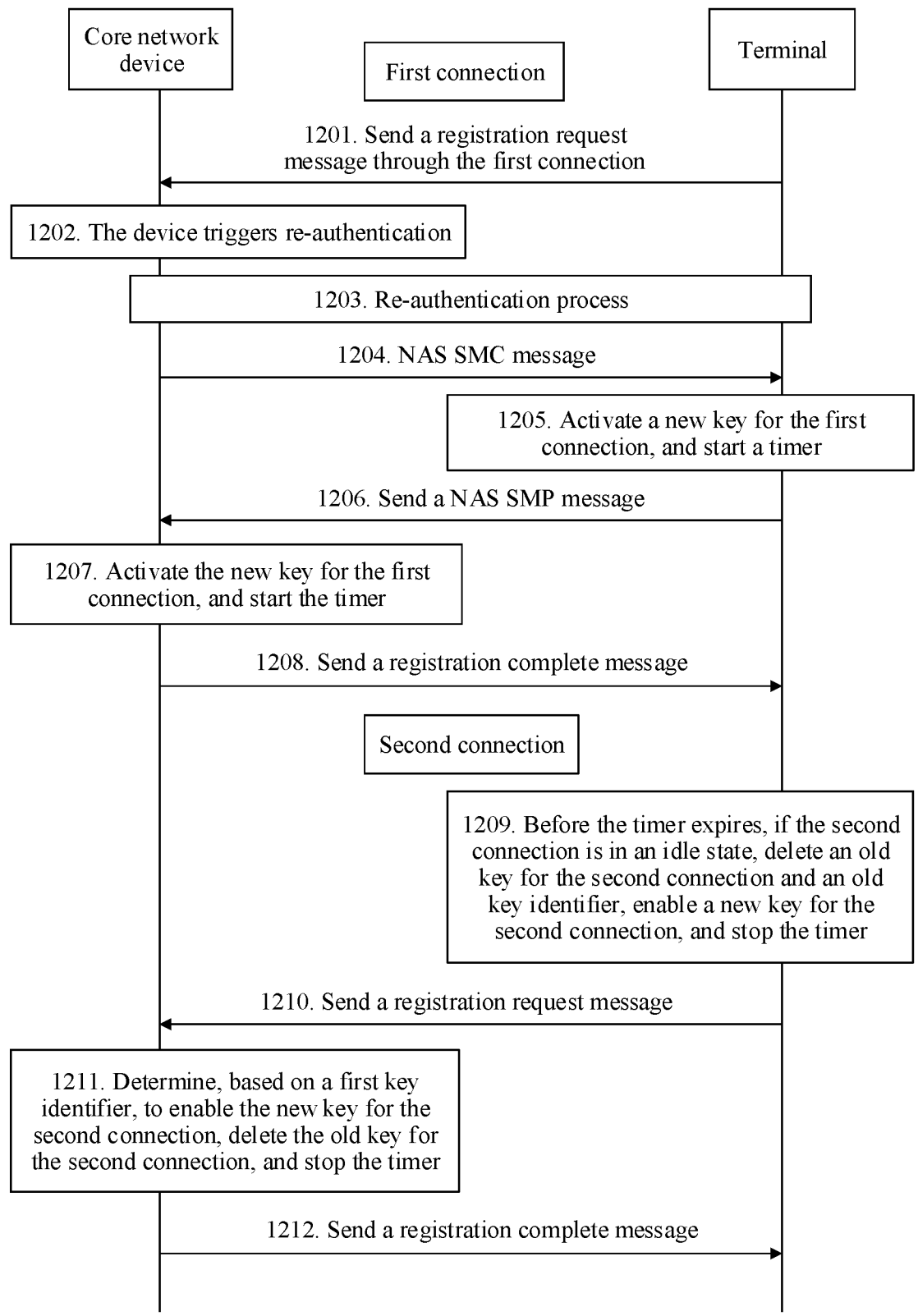
FIG. 12 is a flowchart of another key generation method according to an embodiment of this application.

In another possible implementation scenario, a condition for triggering the update of the key for the second connection is related to a timer and a state of the second connection. As shown in FIG. 12, the method includes step 1201 to step 1212.

In step 1201 to step 1208, a terminal communicates with a core network device through a first connection.

Step 1201. The terminal sends a registration request message to the core network device through the first connection; correspondingly, an AMF node receives the registration request message.

Optionally, the registration request message may alternatively be the NAS message in step 901. For details, refer to the related description of step 901. Details are not described herein again.

Step 1202. The core network device triggers re-authentication.

Step 1203. The core network device and the terminal perform a re-authentication procedure.

Step 1204. The core network device sends a NAS SMC message to the terminal. Correspondingly, the terminal receives the NAS SMC message.

Step 1205. The terminal activates a new key for the first connection, and starts a timer.

That the terminal activates the new key for the first connection means that a key for the first connection has been updated, and then the terminal performs security protection by using the updated key for the first connection, on a NAS message that is sent by the terminal subsequently to the core network device through the first connection.

Step 1206. The terminal sends a NAS SMP message to the core network device. Correspondingly, the terminal receives the NAS SMP message from the core network device.

Step 1207. The core network device activates the new key for the first connection, and starts the timer.

That the core network device activates the new key for the first connection means that the key for the first connection has been updated, and then the core network device performs security protection, by using the updated key for the first connection, on the NAS message that is sent by the core network device subsequently to the terminal through the first connection.

Step 1208. The core network device sends a registration complete message to the terminal. Correspondingly, the terminal receives the registration complete message.

In step 1209 to step 1212, the terminal communicates with the core network device through the second connection.

Step 1209. Before the timer expires, if the second connection is in an idle state, the terminal deletes an old key for the second connection and an old key identifier, enables a new key for the second connection, and stops the timer.

If the first connection and the second connection share a set of keys, the new key for the second connection is the same as the new key for the first connection. The first key identifier is used to indicate the new key for the first connection and the new key for the second connection.

Optionally, before the timer expires, if the second connection is in a connected state, the terminal may still use the old key for the second connection.

Step 1210. The terminal sends a registration request message to the core network device. Correspondingly, the core network device receives the registration request message.

Integrity protection is performed on the registration request message by using the new key for the second connection, and the registration request message carries a first key identifier.

Step 1211. The core network device determines, based on the first key identifier, to enable the new key for the second connection, deletes the old key for the second connection, and stops the timer.

After receiving the registration request message, the core network device may determine, based on the first key identifier, that the new key for the second connection is the same as the new key for the first connection, and further perform integrity verification on the registration request message by using the new key for the second connection. After the verification succeeds, the core network device deletes the old key for the second connection, and stops the timer.

Step 1212. The core network device sends a registration complete message to the terminal; correspondingly, the terminal receives the registration complete message from the core network device.

Integrity protection is performed on the registration complete message by using the new key for the second connection.

Figure 13:
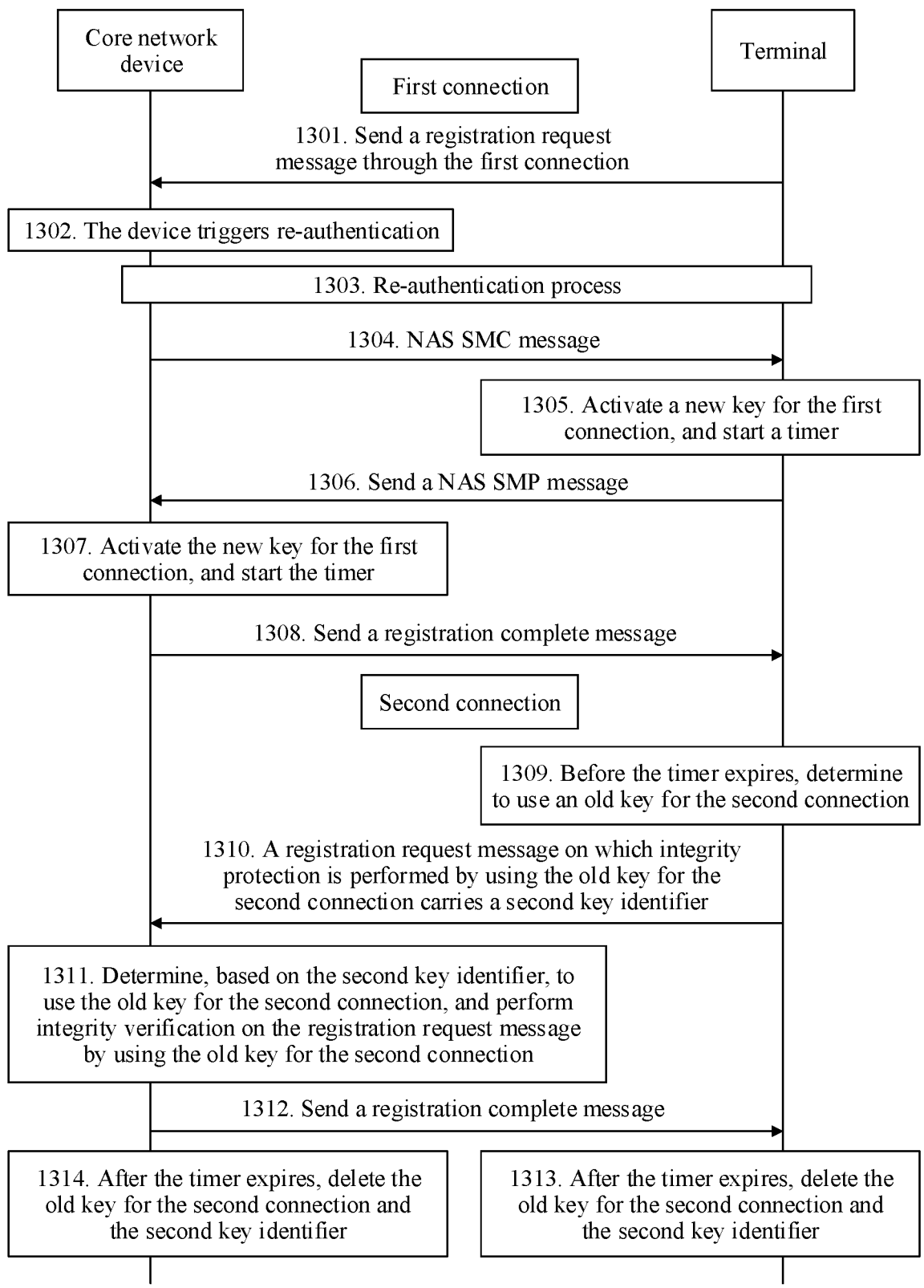
FIG. 13 is a flowchart of another key generation method according to an embodiment of this application.

In another possible implementation, as shown in FIG. 13, a condition for triggering the update of the key for the second connection is irrelevant to a state of the second connection. As shown in FIG. 13, the method includes step 1301 to step 1314.

Step 1301 to step 1308 are the same as step 1201 to step 1208, and details are not described herein again.

In step 1309 to step 1314, the terminal communicates with the core network device through the second connection.

Step 1309. Before the timer expires, the terminal determines to use an old key for the second connection.

A second key identifier is used to identify the old key for the second connection. It may be understood that, in this embodiment of this application, a new key is an updated key, and the old key is a key that is used before update. When the first connection and the second connection share a set of keys, the old key for the second connection is the same as a key before the first connection is used for re-authentication.

Step 1310. The terminal sends, to the core network device, a registration request message on which integrity protection is performed by using the old key for the second connection, where the registration request message carries the second key identifier. Correspondingly, the core network device receives the registration request message.

Step 1311. The core network device determines, based on the second key identifier, the old key for the second connection, and performs integrity verification on the registration request message by using the old key for the second connection.

Step 1312. The core network device sends a registration complete message to the terminal.

Step 1313. After the timer expires, the terminal deletes the old key for the second connection and the second key identifier.

Step 1314. After the timer expires, the core network device deletes the old key for the second connection and the second key identifier.

After deleting the old key for the second connection and the second key identifier, the terminal and the core network device may use the new key for the first connection as the new key for the second connection.

Optionally, in the method procedure in FIG. 13, before the timers of the terminal and the core network device expire, if the core network device triggers a re-authentication procedure again, the timers of the terminal and the core network device may continue to perform timing. After the timers expire, step 1313 and step 1314 are performed. Alternatively, the terminal and the core network device may restart timing, and after the timer expires, perform step 1313 and step 1314.

The foregoing mainly describes the solutions provided in the embodiments of this application from a perspective of interaction between the core network device and the terminal. It may be understood that to implement the foregoing functions, the terminal and the core network device include corresponding hardware structures and/or software modules for performing the functions. With reference to the units and algorithm steps in the examples described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, division into function units may be performed on the terminal and the core network device based on the foregoing method examples. For example, each function unit may be obtained through division based on a corresponding function, or two or more functions may be integrated into one processing unit. The integrated unit may be implemented in a form of hardware, or may be implemented in a form of a software functional unit. It should be noted that, in the embodiments of this application, division into units is used as an example, and is merely a logical function division. In actual implementation, another division manner may be used.

Figure 14:
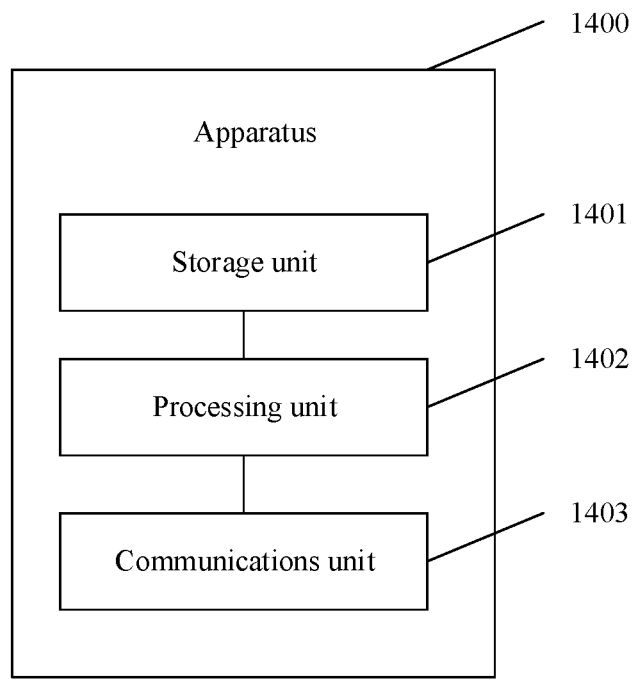
FIG. 14 is a schematic structural diagram of an apparatus according to an embodiment of this application.

When an integrated unit is used, FIG. 14 is a schematic block diagram of an apparatus according to an embodiment of the present invention. The apparatus may exist in a form of software, or may be a core network device, or may be a chip in a core network device. The apparatus 1400 includes a processing unit 1402 and a communications unit 1403. The processing unit 1402 is configured to control and manage an action of the apparatus 1400. For example, the processing unit 1402 is configured to support the apparatus 1400 in performing steps 401 and 402 in FIG. 4, steps 502 and 503 in FIG. 5, steps 601, 602, 607, and 608 in FIG. 6, steps 701, 702, 703, and 704 in FIG. 7, steps 801, 803, and 805 in FIG. 8, steps 902, 903, 904, and 910 in FIG. 9, steps 1002, 1003, 1005, 1007, and 1008 in FIG. 10, and steps 1102, 1103, 1104, 1107, and 1112 in FIG. 11, steps 1202, 1203, 1207, and 1211 in FIG. 12, steps 1302, 1303, 1307, 1311, and 1314 in FIG. 13, and/or another process of the technology described in this specification. The communications unit 1403 is configured to support communication between the apparatus 1400 and another network element (for example, a terminal). For example, the communications unit 1403 may support the apparatus 1400 in performing steps 501 and 504 in FIG. 5, step 603 in FIG. 6, step 705 in FIG. 7, step 802 in FIG. 8, steps 905, 908, 911, and 914 in FIG. 9, steps 1004, 1009, and 1014 in FIG. 10, steps 1105, 1109, 1113, and 1115 in FIG. 11, steps 1204, 1208, and 1212 in FIG. 12, and steps 1304, 1308, and 1312 in FIG. 13. The apparatus 1400 may further include a storage unit 1401, configured to store program code and data of the apparatus 1400.

The processing unit 1402 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The controller/processor may implement or execute various examples of logical blocks, modules, and circuits described with reference to content disclosed in the present invention. The processor may be a combination of processors implementing a computing function, for example, a combination of one or more microprocessors, or a combination of a DSP and a microprocessor. The communications unit 1403 may be a communications interface, and the communications interface is a general term. In specific implementation, the communications interface may include a plurality of interfaces, and may include, for example, an interface between access network devices, an interface between an access network device and a core network device, and/or another interface. The storage unit 1401 may be a memory.

Figure 15:
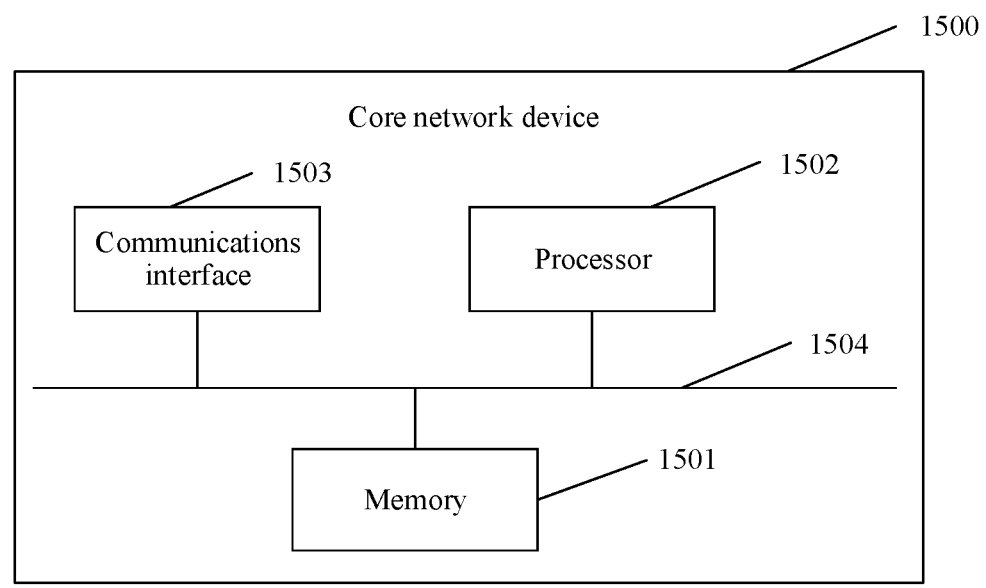
FIG. 15 is a schematic structural diagram of a core network device according to an embodiment of this application.

When the processing unit 1402 is a processor, the communications unit 1403 is a communications interface, and the storage unit 1401 is a memory, a structure of the apparatus 1400 in this embodiment of this application may be a structure of a core network device shown in FIG. 15.

FIG. 15 shows a possible schematic structural diagram of a core network device according to an embodiment of this application.

As shown in FIG. 15, the core network device 1500 includes a processor 1502, a communications interface 1503, and a memory 1501. Optionally, the core network device 1500 may further include a bus 1504. The communications interface 1503, the processor 1502, and the memory 1501 may be connected to each other by using the bus 1504. The bus 1504 may be a PCI bus, an EISA bus, or the like. The bus 1504 may be classified into an address bus, a data bus, a control bus, and the like. For ease of representation, only one thick line is used to represent the bus in FIG. 15, but this does not mean that there is only one bus or only one type of bus.

Figure 16:
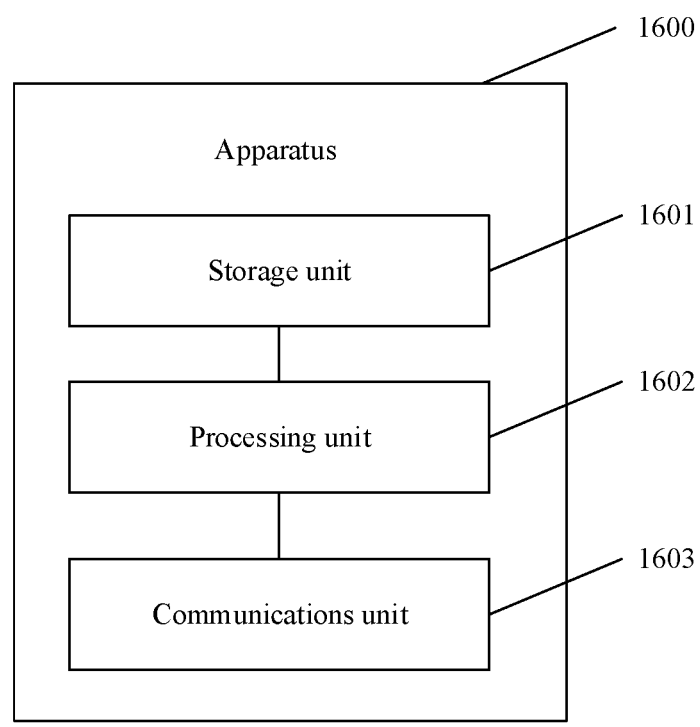
FIG. 16 is a schematic structural diagram of another apparatus according to an embodiment of this application.

When an integrated unit is used, FIG. 16 shows a schematic block diagram of another apparatus according to an embodiment of this application. The apparatus 1600 may exist in a form of software, or may be a terminal, or may be a chip in a terminal. The apparatus 1600 includes: a processing unit 1602 and a communications unit 1603. The processing unit 1602 is configured to control and manage an action of the apparatus 1600. For example, the processing unit 1602 is configured to support the apparatus 1600 in performing steps 401 and 403 in FIG. 4, step 505 in FIG. 5, steps 604, 605, and 609 in FIG. 6, step 706 in FIG. 7, and steps 801, 804, and 806 in FIG. 8, steps 903, 906, and 912 in FIG. 9, steps 1008 and 1010 in FIG. 10, steps 1104, 1108, and 1110 in FIG. 11, steps 1205 and 1209 in FIG. 12, and steps 1305, 1309, and 1313 in FIG. 13, and/or another process of the technology described in this specification. The communications unit 1603 is configured to support communication between the apparatus 1600 and another network element (such as a core network device and an N3IWF node). For example, the communications unit 1603 is configured to support the apparatus 1600 in performing step 606 in FIG. 6, steps 901, 907, 909, and 913 in FIG. 9, steps 1001, 1006, and 1011 in FIG. 10, steps 1101, 1106, 1111, and 1114 in FIG. 11, steps 1201, 1206, and 1210 in FIG. 12, and steps 1301, 1306, and 1310 in FIG. 13. The apparatus 1600 may further include a storage unit 1601, configured to store program code and data of the apparatus 1600.

The processing unit 1602 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The controller/processor may implement or execute various examples of logical blocks, modules, and circuits described with reference to content disclosed in this application. The processor may be a combination of processors implementing a computing function, for example, a combination of one or more microprocessors, or a combination of a DSP and a microprocessor. The communications unit 1603 may be a transceiver, a transceiver circuit, a communications interface, or the like. The storage unit 1601 may be a memory.

Figure 17:
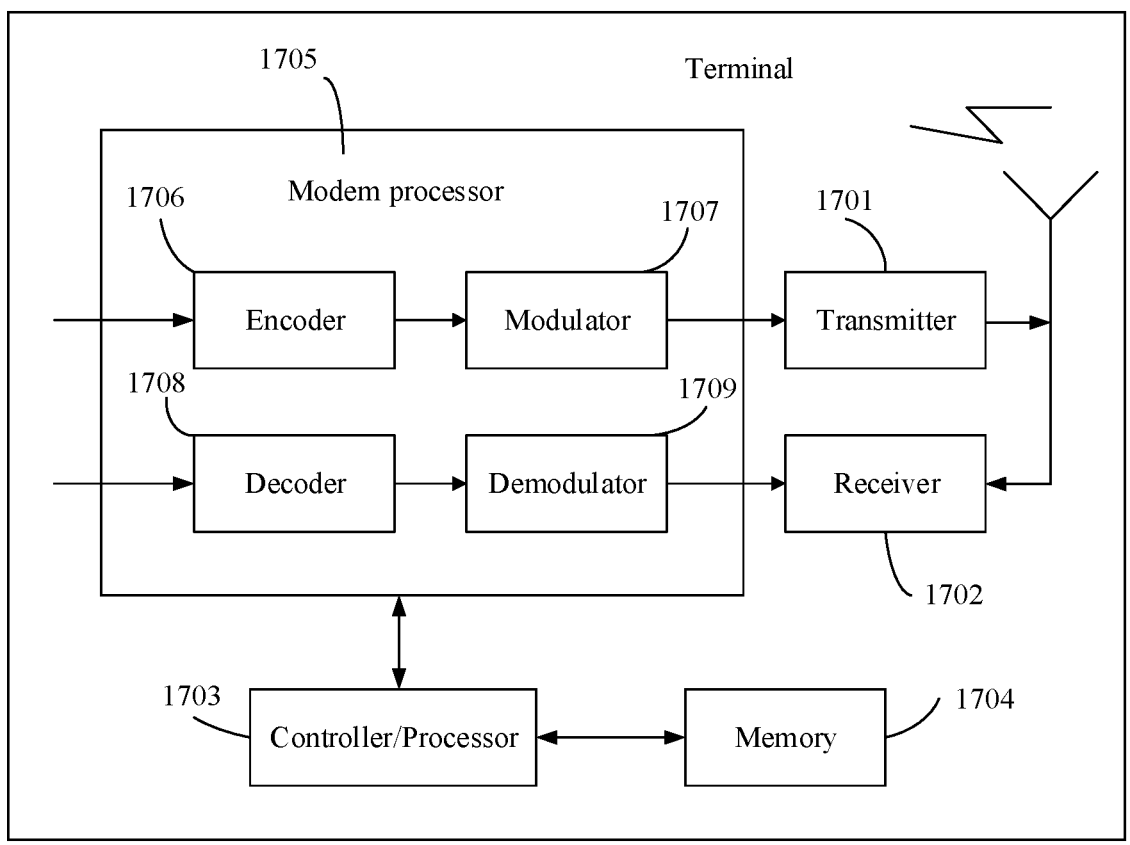
FIG. 17 is a schematic structural diagram of an apparatus according to an embodiment of this application.

When the processing unit 1602 is a processor, the communications unit 1603 is a transceiver, and the storage unit 1601 is a memory, the apparatus 1600 in this embodiment of this application may be a terminal shown in FIG. 17.

FIG. 17 is a simplified schematic diagram of a possible design structure of the terminal in an embodiment of this application. The terminal 1700 includes a transmitter 1701, a receiver 1702, and a processor 1703. The processor 1703 may alternatively be a controller, and is represented as a "controller/processor 1703" in FIG. 17. Optionally, the terminal 1700 may further include a modem processor 1705, and the modem processor 1705 may include an encoder 1706, a modulator 1707, a decoder 1708, and a demodulator 1709.

In an example, the transmitter 1701 adjusts (for example, through analog conversion, filtering, amplification, and up-conversion) an output sample and generates an uplink signal. The uplink signal is transmitted by an antenna to the base station in the foregoing embodiments. In a downlink, the antenna receives a downlink signal transmitted by the base station in the foregoing embodiments. The receiver 1702 adjusts (such as through filtering, amplification, down-conversion, and digitization) a signal received from the antenna and provides an input sample. In the modem processor 1705, an encoder 1706 receives service data and a signaling message to be sent in the uplink, and processes (such as through formatting, encoding, and interleaving) the service data and the signaling message. The modulator 1707 further processes (such as through symbol mapping and modulation) the encoded service data and signaling message, and provides an output sample. The demodulator 1709 processes (such as through demodulation) the input sample and provides a symbol estimation. The decoder 1708 processes (such as through de-interleaving and decoding) the symbol estimation and provides the decoded data and signaling message that are sent to the terminal 1700. The encoder 1706, the modulator 1707, the demodulator 1709, and the decoder 1708 may be implemented by a combined modem processor 1705. These units perform processing based on a radio access technology (for example, an access technology of an LTE or another evolution system) used by a radio access network. It should be noted that when the terminal 1700 does not include the modem processor 1705, the foregoing functions of the modem processor 1705 may alternatively be completed by the processor 1703.

The processor 1703 controls and manages actions of the terminal 1700 and is configured to perform the processing procedures performed by the terminal 1700 in the embodiments of this application. For example, the processor 1703 is further configured to perform the processing processes of the terminal in the methods shown FIG. 4 to FIG. 13 and/or another process of the technical solutions described in this application.

Further, the terminal 1700 may further include a memory 1704, where the memory 1704 is configured to store program code and data of the terminal 1700.

Method or algorithm steps described in combination with the content disclosed in this application may be implemented by hardware, or may be implemented by a processor by executing a software instruction. The software instruction may include a corresponding software module. The software module may be stored in a random access memory (RAM), a flash memory, a read only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, an example of a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network device or a terminal. Certainly, the processor and the storage medium may exist in the core network device or the terminal as discrete components.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or other forms.

The units described as separate parts may or may not be physically separate, and parts displayed as units may or may not be physical units, may be located at one position, or may be distributed on a plurality of network device. Some or all of the units may be selected based on actual requirements to achieve the objectives of the solutions of the embodiments.

In addition, functional units in the embodiments of the present invention may be integrated into one processing unit, or each of the functional units may exist independently, or two or more units are integrated into one unit. The integrated unit may be implemented in a form of hardware, or may be implemented in a form of hardware in addition to a software functional unit.

Based on the foregoing descriptions of the implementations, a person skilled in the art may clearly understand that this application may be implemented by software in addition to necessary universal hardware or by hardware only. In most circumstances, the former is a implementation. Based on such an understanding, the technical solutions of this application essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, a network device, or the like) to perform the methods described in the embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A key update method, applied to a communications system, wherein the communications system comprises a core network device, there are a first connection corresponding to a 3rd generation partnership project (3GPP) access technology and a second connection corresponding to a non-3GPP access technology between the core network device and a terminal, the first connection and the second connection share a first key, and the first key has a first key identifier that identifies the first key, and the method comprises:

updating, by the core network device, the first key to obtain an updated key for the first connection and obtaining a second key identifier, wherein the second key identifier identifies the updated key;

in response to determining that the second connection is in a connected state, retaining, by the core network device, the first key for the second connection and the first key identifier; and keeping, by the core network device before updating the first key for the second connection, using the first key for the second connection when the core network device communicates with the terminal through the second connection.

2. The method according to claim 1, wherein the method further comprises:

sending, by the core network device, a first non-access stratum (NAS) security mode command (SMC) message to the terminal through the first connection; and wherein the first NAS SMC message comprises the second key identifier; and receiving, by the core network device, a first NAS security mode completion (SMP) message from the terminal through the first connection, wherein integrity protection is performed on the first NAS SMP message based on the updated key.

3. The method according to claim 1, wherein the method further comprises:

before updating the first key to obtain the updated key for the first connection, determining, by the core network device according to configuration information of an operator or a NAS COUNT used by the terminal that is about to be wrap around, that the terminal needs to be re-authenticated.

4. The method according to claim 1, wherein the method further comprises:
determining, by the core network device, a state of the second connection.

5. The method according to claim 1, wherein the method further comprises:
updating, by the core network device, the first key for the second connection using the updated key; and
after updating the first key for the second connection, using, by the core network device, the updated key for the second connection when the core network device communicates with the terminal through the second connection.

6. The method according to claim 5, wherein the method further comprises:
sending, by the core network device, a second NAS SMC message to the terminal through the second connection, wherein the second NAS SMC message comprises the second key identifier; and
receiving, by the core network device, a second NAS SMP message from the terminal through the second connection, wherein integrity protection is performed on the second NAS SMP message based on the updated key.

7. The method according to claim 5, wherein the method further comprises:
after the updating the first key for the second connection, deleting, by the core network device, the first key and the first key identifier.

8. A key update method, applied to a communications system, wherein the communications system comprises a terminal, there are a first connection corresponding to a 3rd generation partnership project (3GPP) access technology and a second connection corresponding to a non-3GPP access technology between the terminal and a core network device, the first connection and the second connection share a first key, and the first key has a first key identifier that identifies the first key, and the method comprises:
receiving, by the terminal, a first non-access stratum (NAS) security mode command (SMC) message from the core network device through the first connection, wherein the first NAS SMC message comprises a second key identifier;
updating, by the terminal, the first key to obtain an updated key for the first connection, wherein the updated key is identified by the second key identifier;
sending, by the terminal, a first NAS security mode completion (SMP) message to the core network device through the first connection, wherein integrity protection is performed on the first NAS SMP message based on the updated key;
receiving, by the terminal, a second NAS SMC message from the core network device through the second connection, wherein the second NAS SMC message comprises the second key identifier;
updating, by the terminal, the first key for the second connection using the updated key; and
sending, by the terminal, a second NAS SMP message to the core network device through the second connection, wherein integrity protection is performed on the second NAS SMP message based on the updated key.

9. The method according to claim 8, wherein the method further comprises:
after updating the first key for the second connection using the updated key, deleting, by the terminal, the first key and the first key identifier.

10. The method according to claim 8, wherein, before updating the first key for the second connection, keeping using the first key for the second connection when the terminal communicates with the core network device through the second connection.

11. An apparatus, applied to a communications system, wherein the communications system comprises the apparatus, there are a first connection corresponding to a 3GPP access technology and a second connection corresponding to a non-3GPP access technology between the apparatus and a terminal, the first connection and the second connection share a first key, and the first key has a first key identifier that identifies the first key, and the apparatus comprising:
at least one processor; and
a memory coupled to the at least one processor and having program instructions stored thereon which, when executed by the at least one processor, cause the apparatus to:
update the first key to obtain an updated key for the first connection and obtaining a second key identifier, wherein the second key identifier identifies the updated key;
in response to determining that the second connection is in a connected state, retain the first key for the second connection and the first key identifier; and
before updating the first key for the second connection, keep using the first key for the second connection when the apparatus communicates with the terminal through the second connection.

12. The apparatus according to claim 11, wherein the program instructions stored thereon which, when executed by the at least one processor, cause the apparatus to:
send a first non-access stratum (NAS) security mode command (SMC) message to the terminal through the first connection; and wherein the first NAS SMC message comprises the second key identifier; and
receive a first NAS security mode completion (SMP) message from the terminal through the first connection, wherein integrity protection is performed on the first NAS SMP message based on the updated key.

13. The apparatus according to claim 11, wherein the program instructions stored thereon which, when executed by the at least one processor, cause the apparatus to:
before updating the first key to obtain the updated key for the first connection, determine, according to configuration information of an operator or a NAS COUNT used by the terminal that is about to be wrap around, that the terminal needs to be re-authenticated.

14. The apparatus according to claim 11, wherein the program instructions stored thereon which, when executed by the at least one processor, cause the apparatus to:
determine a state of the second connection.

15. The apparatus according to claim 11, wherein the program instructions stored thereon which, when executed by the at least one processor, cause the apparatus to:
update the first key for the second connection using the updated key; and
after updating the first key for the second connection, use the updated key for the second connection when the apparatus communicates with the terminal through the second connection.

16. The apparatus according to claim 15, wherein the program instructions stored thereon which, when executed by the at least one processor, cause the apparatus to:

send a second NAS SMC message to the terminal through the second connection, wherein the second NAS SMC message comprises the second key identifier; and receive a second NAS SMP message from the terminal through the second connection, wherein integrity protection is performed on the second NAS SMP message based on the updated key.

17. The apparatus according to claim 15, wherein the program instructions stored thereon which, when executed by the at least one processor, cause the apparatus to:

after the updating the first key for the second connection, delete the first key and the first key identifier.

18. An apparatus, applied to a communications system, wherein the communications system comprises the apparatus, there are a first connection corresponding to a 3rd generation partnership project (3GPP) access technology and a second connection corresponding to a non-3GPP access technology between the apparatus and a core network device, and the first connection and the second connection share a first key, and the first key has a first key identifier that identifies the first key, and the apparatus comprising:

at least one processor; and a memory coupled to the at least one processor and having program instructions stored thereon which, when executed by the at least one processor, cause the apparatus to:

receive a first non-access stratum (NAS) security mode command (SMC) message from the core network device through the first connection, wherein the first NAS SMC message comprises a second key identifier;

update the first key to obtain an updated key for the first connection; wherein the updated key is identified by the second key identifier;

send a first NAS security mode completion (SMP) message to the core network device through the first connection, wherein integrity protection is performed on the first NAS SMP message based on the updated key;

receive a second NAS SMC message from the core network device through the second connection, wherein the second NAS SMC message comprises the second key identifier;

update the first key for the second connection using the updated key; and send a second NAS SMP message to the core network device through the second connection, wherein integrity protection is performed on the second NAS SMP message based on the updated key.

19. The apparatus according to claim 18, wherein the program instructions stored thereon which, when executed by the at least one processor, cause the apparatus to:

after updating the first key for the second connection using the updated key, delete the first key and the first key identifier.

20. The apparatus according to claim 18, wherein the program instructions stored thereon which, when executed by the at least one processor, cause the apparatus to, before updating the first key for the second connection, keep using the first key for the second connection when the apparatus communicates with the core network device through the second connection.

* * * * *